United States Patent
Tsukagoshi

(10) Patent No.: US 12,126,848 B2
(45) Date of Patent: Oct. 22, 2024

(54) TRANSMISSION DEVICE, TRANSMISSION METHOD, RECEPTION DEVICE AND RECEPTION METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/459,666

(22) Filed: Sep. 1, 2023

(65) Prior Publication Data

US 2023/0412859 A1 Dec. 21, 2023

Related U.S. Application Data

(63) Continuation of application No. 17/457,848, filed on Dec. 6, 2021, now Pat. No. 11,792,452, which is a
(Continued)

(30) Foreign Application Priority Data

Feb. 9, 2016 (JP) ................. 2016-023185

(51) Int. Cl.
*H04N 21/2365* (2011.01)
*H04N 19/30* (2014.01)
(Continued)

(52) U.S. Cl.
CPC ......... *H04N 21/2365* (2013.01); *H04N 19/30* (2014.11); *H04N 19/33* (2014.11);
(Continued)

(58) Field of Classification Search
None
See application file for complete search history.

(56) References Cited

U.S. PATENT DOCUMENTS

| | | | |
|---|---|---|---|
| 6,118,820 A | | 9/2000 | Reitmeier et al. |
| 2002/0090138 A1 | | 7/2002 | Hamanaka |

(Continued)

FOREIGN PATENT DOCUMENTS

| CN | 103843058 A | 6/2014 |
|---|---|---|
| CN | 104221386 | 12/2014 |

(Continued)

OTHER PUBLICATIONS

International Search Report issued Feb. 28, 2017, in PCT/JP2017/004146, filed Feb. 6, 2017.
(Continued)

*Primary Examiner* — Christopher Braniff
(74) *Attorney, Agent, or Firm* — Chris Kolefas

(57) ABSTRACT

Convenience is achieved in performing processing depending on decoding capability in a reception side. High-frame-rate ultra-high-definition image data is processed to obtain first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high definition image by being used with the first to third image data. A container is transmitted including a predetermined number of video streams including encoded image data of the first to fourth image data. Information is inserted into the container, the information corresponding to information that is inserted into each of the predetermined number of video streams and associated with image data included in the video streams.

36 Claims, 26 Drawing Sheets

Related U.S. Application Data continuation of application No. 16/930,011, filed on Jul. 15, 2020, now Pat. No. 11,223,859, which is a continuation of application No. 16/072,542, filed as application No. PCT/JP2017/004146 on Feb. 6, 2017, now Pat. No. 10,764,615.

(51) Int. Cl.
  *H04N 19/33* (2014.01)
  *H04N 19/70* (2014.01)
  *H04N 21/2343* (2011.01)
  *H04N 21/434* (2011.01)

(52) U.S. Cl.
  CPC ..... *H04N 19/70* (2014.11); *H04N 21/234327* (2013.01); *H04N 21/234363* (2013.01); *H04N 21/234381* (2013.01); *H04N 21/4345* (2013.01); *H04N 21/4347* (2013.01)

(56) References Cited

U.S. PATENT DOCUMENTS

| | | |
|---|---|---|
| 2006/0156363 A1 | 7/2006 | Wu et al. |
| 2007/0016594 A1 | 1/2007 | Visharam et al. |
| 2010/0161692 A1 | 6/2010 | Visharam et al. |
| 2010/0198887 A1 | 8/2010 | Visharam et al. |
| 2013/0191550 A1 | 7/2013 | Hannuksela |
| 2013/0235152 A1 | 9/2013 | Hannuksela et al. |
| 2013/0243391 A1 | 9/2013 | Park |
| 2013/0307942 A1 | 11/2013 | Dini et al. |
| 2015/0229878 A1 | 8/2015 | Hwang et al. |
| 2015/0341611 A1 | 11/2015 | Oh et al. |
| 2016/0073118 A1 | 3/2016 | Iguchi et al. |
| 2016/0134902 A1 | 5/2016 | Tsukagoshi |
| 2016/0142762 A1 | 5/2016 | Tsukagoshi |
| 2016/0301940 A1 | 10/2016 | Tsukagoshi |
| 2017/0085922 A1 | 3/2017 | Tsukagoshi |
| 2018/0054636 A1 | 2/2018 | Tsukagoshi |

FOREIGN PATENT DOCUMENTS

| | | |
|---|---|---|
| CN | 104541511 A | 4/2015 |
| CN | 104604236 | 5/2015 |
| EP | 2947560 A1 | 11/2015 |
| JP | 11-266457 A | 9/1999 |
| JP | 2008-543142 A | 11/2008 |
| JP | 2015-5976 A | 1/2015 |
| JP | 2015013726 A | 1/2015 |
| JP | 2015-57875 A | 3/2015 |
| JP | 2015-65530 A | 4/2015 |
| JP | 2016540404 A | 12/2016 |
| KR | 20140095011 | 7/2014 |
| KR | 20150052029 | 5/2015 |
| WO | 2014/034463 A1 | 3/2014 |
| WO | 2015/029754 A1 | 3/2015 |

OTHER PUBLICATIONS

Amonou, I. et al., "On the high level syntax for SVC", Joint Video Team (JVT) of ISO/IEC MPEG & ITU-T VCEG (ISO/IEC JTC1/SC29/WG11 and ITU-T SG16 Q.6), Jul. 24-29, 2005.

Naccari, M. et al., "High dynamic range compatibility information SEI message", Joint Collaborative Team on Video Coding (JCT-VC) of ITU-T SG 16 WP 3 and ISO/IEC JTC 1/SC 29/WG 11, Jun. 19-26, 2015.

Extended European Search Report issued Oct. 17, 2018 in Patent Application No. 17750193.9.

Ingo Kofler et al.—"Implications of the ISO Base Media File Format on Adaptive HTTP Streaming of H.264.SVC", Proceedings of 2012 IEEE Consumer Communications and Networking Conference (CCNC), Jan. 17, 2012, pp. 549-553 <DOI:10.1109/CCNC.2012.6180986>.

Peter Amon et al.,—"File Format for Scalable Video Coding", IEEE Transactions on Circuits and Systems for Video Technology. Sep. 24, 2007. vol. 17, No. 9, pp. 1174-1185. ISSN: 1051-8215, <DOI:10.1109/TCSVT2007.905521>.

FIG. 8

HEVC SPS (Sequence Parameter Set)

| SPS elements | VALUE | |
|---|---|---|
| general_level_idc | 156 | → Level 5.2 |
| general_profile_idc | 7 | → Scalable Main10 Profile |
| sps_max_sublayer_minus1 (=j) | 3 | |
| sublayer_level_present_flag[j-1] | 1 | |
| sublayer_level_idc[j-1] | 153 | → Level 5.1 |
| sublayer_profile_idc[j-1] | 7 | → Scalable Main10 Profile |
| sublayer_level_present_flag[j-2] | 1 | |
| sublayer_level_idc[j-2] | 150 | → Level 5 |
| sublayer_profile_idc[j-2] | 2 | → Main10 Profile |
| sublayer_level_present_flag[j-3] | 1 | |
| sublayer_level_idc[j-3] | 123 | → Level 4.1 |
| sublayer_profile_idc[j-3] | 2 | → Main10 Profile |

FIG. 9

Case1(Base Layer file)

```
// OUTSIDE OF moof
    'leva'
        level_count = 2
            - track_id           (level0) TR0    (level1) TR0
            - assignment_type    0               0
              grouping_type      1               1 ("temporal_layer_group")
            ( - assignment_type  4               4  )
            (   sub_track_id     0               1  )

// moof  (moof0)
    traf / tfhd
            - track_id   (=TR0)
         / tfdt
            - baseMediaDecodeTime
         /trun
            -sample_count
            -sample_composition_time_offset
         / sgpd (Sample Group Description Box)
              ┌── - grouping_type = "1" (temporal_layer_group)
              │
              ├── scif (scalable group entry)
              │      - group_id(=0) ,primary_groupID(=0)
              │
              └── tscl("temporalLayerEntry")
                     - temporalLayerId=0
                     - tlprofile_idc=2
                     - tllevel_idc = 123
                     - tlConstantFrameRate=1

/ sgpd (Sample Group Description Box)
              ┌── - grouping_type = "1" (temporal_layer_group)
              │
              ├── scif (scalable group entry)
              │      - group_id(=1) , primary_groupID(=0)
              │
              └── tscl("temporalLayerEntry")
                     - temporalLayerId=1
                     - tlprofile_idc=2
                     - tllevel_idc = 150
                     - tlConstantFrameRate=1
```

FIG. 10

Case1(Scalable Layer file)

```
// OUTSIDE OF moof
    'leva'
        level_count = 2
            - track_id            (level0) TR1      (level1) TR1
            - assignment_type        0                0
                grouping_type        1                1 ("temporal_layer_group")
         ( - assignment_type        4                4  )
         (   sub_track_id           2                3  )
// moof (moof1)
    traf / tfhd
                - track_id   (=TR1)
         / tfdt
                - baseMediaDecodeTime
         /trun
                -sample_count
                -sample_composition_time_offset
   / sgpd (Sample Group Description Box)
            ├── - grouping_type  = "1" (temporal_layer_group)
            ├── scif (scalable group entry)
            │       - group_id(=2) ), primary_groupID(=0)
            ├── tscl("temporalLayerEntry")
                    - temporalLayerId=0
                    - tlprofile_idc=7
                    - tllevel_idc = 153
                    - tlConstantFrameRate=1
       / sgpd (Sample Group Description Box)
            ├── - grouping_type  = "1" (temporal_layer_group)
            ├── scif (scalable group entry)
            │       - group_id(=3) ), primary_groupID(=0)
            ├── tscl("temporalLayerEntry")
                    - temporalLayerId=1
                    - tlprofile_idc=7
                    - tllevel_idc = 156
                    - tlConstantFrameRate=1
```

FIG. 12

Case2(Base Layer file)

```
// OUTSIDE OF moof
    'leva'
        level_count = 2
            - track_id          (level0) TR0    (level1) TR1
            - grouping_type         1           1 ("temporal_layer_group")
            - assignment_type       2           2

// moof (moof0)
    traf / tfhd
            - track_id   (=TR0)
        / tfdt
            - baseMediaDecodeTime
        /trun
            -sample_count
            -sample_composition_time_offset
        / sgpd (Sample Group Description Box)
            - grouping_type  = "1" (temporal_layer_group)
            ├─ scif (scalable group entry)
            │      - group_id(=0) ,primary_groupID(=0)
            ├─ tscl("temporalLayerEntry")
                    - temporalLayerId=0
                    - tlprofile_idc=2
                    - tllevel_idc = 123
                    - tlConstantFrameRate=1
// moof (moof1)
    traf / tfhd
            - track_id   (=TR1)
        / tfdt
            - baseMediaDecodeTime
        /trun
            -sample_count
            -sample_composition_time_offset
        / sgpd (Sample Group Description Box)
            - grouping_type  = "1" (temporal_layer_group)
            ├─ scif (scalable group entry)
            │      - group_id(=1) ,primary_groupID(=0)
            ├─ tscl("temporalLayerEntry")
                    - temporalLayerId=1
                    - tlprofile_idc=2
                    - tllevel_idc = 150
                    - tlConstantFrameRate=1
```

FIG. 13

Case2(Scalable Layer file)

```
// OUTSIDE OF moof
   'leva'
      level_count = 2
         - track_id          (level0) TR2    (level1) TR3
         - grouping_type           1              1 ("temporal_layer_group")
         - assignment_type         2              2

// moof (moof2)
    traf / tfhd
              - track_id   (=TR2)
         / tfdt
              - baseMediaDecodeTime
         /trun
              -sample_count
              -sample_composition_time_offset
         / sgpd (Sample Group Description Box)
              ┌   - grouping_type  = "1" (temporal_layer_group)
              ├─ scif (scalable group entry)
              │     - group_id(=2) ,primary_groupID(=0)
              └─ tscl("temporalLayerEntry")
                    - temporalLayerId=0
                    - tlprofile_idc=7
                    - tllevel_idc = 153
                    - tlConstantFrameRate=1
// moof (moof3)
    traf / tfhd
              - track_id   (=TR3)
         / tfdt
              - baseMediaDecodeTime
         /trun
              -sample_count
              -sample_composition_time_offset
         / sgpd (Sample Group Description Box)
              ┌   - grouping_type  = "1" (temporal_layer_group)
              ├─ scif (scalable group entry)
              │     - group_id(=3) ,primary_groupID(=0)
              └─ tscl("temporalLayerEntry" )
                    - temporalLayerId=1
                    - tlprofile_idc=7
                    - tllevel_idc = 156
                    - tlConstantFrameRate=1
```

FIG. 15

CASE OF TWO-file stream → MPD

```
<Period>
  <AdaptationSet mimeType="video/mp4" codecs="hev1.xx.xx.L150,xx, hev1.yy.yy.L156,yy">
    <SupplementaryDescriptor schemeIdUri="urn:brdcst:video:highdynamicrange" value="HDR"/>
    <SupplementaryDescriptor schemeIdUri="urn:brdcst:video:transferfunction" value="TFtype"/>
    <SupplementaryDescriptor schemeIdUri="urn:brdcst:video:xycolourprimaries" value="ColorGamut"/>
    <Representation frameRate=120 >
      <BaseURL>videostreamBase.mp4</BaseURL>
      <SubRepresentation
        width="1920" height="1080" frameRate="60"
        codecs="hev1.xx.xx.L123,xx"
        level= "0" />
      </SubRepresentation>
      <SubRepresentation
        width="1920" height="1080" frameRate="120"
        codecs="hev1.xx.xx.L150,xx"
        level= "1"
        dependencyLevel="0" />
      </SubRepresentation>
    </Representation>
    <Representation frameRate=120 >
      <BaseURL>video-bitstreamScalable.mp4</BaseURL>
      <SubRepresentation
        width="3840" height="2160" frameRate="60"
        codecs="hev1.yy.yy.L153,yy"
        level= "2"
        dependencyLevel="0" />
      </SubRepresentation>
      <SubRepresentation
        width="3840" height="2160" frameRate="120"
        codecs="hev1.yy.yy.L156,yy"
        level= "3"
        dependencyLevel="0", "1","2" />
      </SubRepresentation>
    </Representation>
  </AdaptationSet>
</Period>
```

FIG. 16

| value | SEMANTICS OF SupplementaryDescriptor |
|---|---|
| "urn:brdcst:video:highdynamicrange" | |
| "HDR" or "1" | CURRENT STREAM IS HDR |
| "SDR" or "0" | CURRENT STREAM IS SDR |
| | |
| "urn:brdcst:video:transferfunction" | |
| "bt709" or "1" | BT.709-5 Transfer Function |
| "bt2020-10" or "14" | 10bit BT.2020 Transfer Function |
| "st2084" or "16" | SMPTE 2084 Transfer Function |
| "arib-b67" or "18" | ARIB STD B-67 Transfer Function |
| | |
| "urn:brdcst:video:xycolourprimaries" | |
| "bt709" or "1" | BT.709-5 |
| "bt2020" or "9" | BT.2020 |
| "st428" or "10" | SMPTE 428 or XYZ |

FIG. 17

CASE OF FOUR-stream
[MPD]

```
<Period>
<AdaptationSet mimeType="video/mp4" codecs="hev1.xx.xx.L123,xx, hev1.xx.xx.L150,xx , hev1.yy.yy.L153,yy , hev1.yy.yy.L156,yy"
  <SupplementaryDescriptor schemeIdUri="urn:brdcst:video:highdynamicrange" value="HDR"/>
  <SupplementaryDescriptor schemeIdUri="urn:brdcst:video:transferfunction" value="TFtype"/>
  <SupplementaryDescriptor schemeIdUri="urn:brdcst:video:xycolourprimaries" value="ColorGamut"/>
  <Representation
    width="1920" height="1080" frameRate="60"
    codecs="hev1.xx.xx.L123,xx"
    level= "0" />
    <BaseURL>video-base1subbitstream.mp4</BaseURL>
  </Representation>
  <Representation
    width="1920" height="1080" frameRate="120"
    codecs="hev1.xx.xx.L150,xx"
    level= "1"
    dependencyLevel="0" />
    <BaseURL>video-base2subbitstream.mp4</BaseURL>
  </Representation>
  <Representation
    width="3840" height="2160" frameRate="60"
    codecs="hev1.yy.yy.L153,yy"
    level= "2"
    dependencyLevel="0" />
    <BaseURL>video-e1subbitstream.mp4</BaseURL>
  </Representation>
  <Representation
    f width="3840" height="2160" frameRate="120"
    codecs="hev1.yy.yy.L156,yy"
    level= "3"
    dependencyLevel="0", "1", "2" />
    <BaseURL>video-e2subset.mp4</BaseURL>
  </Representation>
</AdaptationSet>
</Period>
```

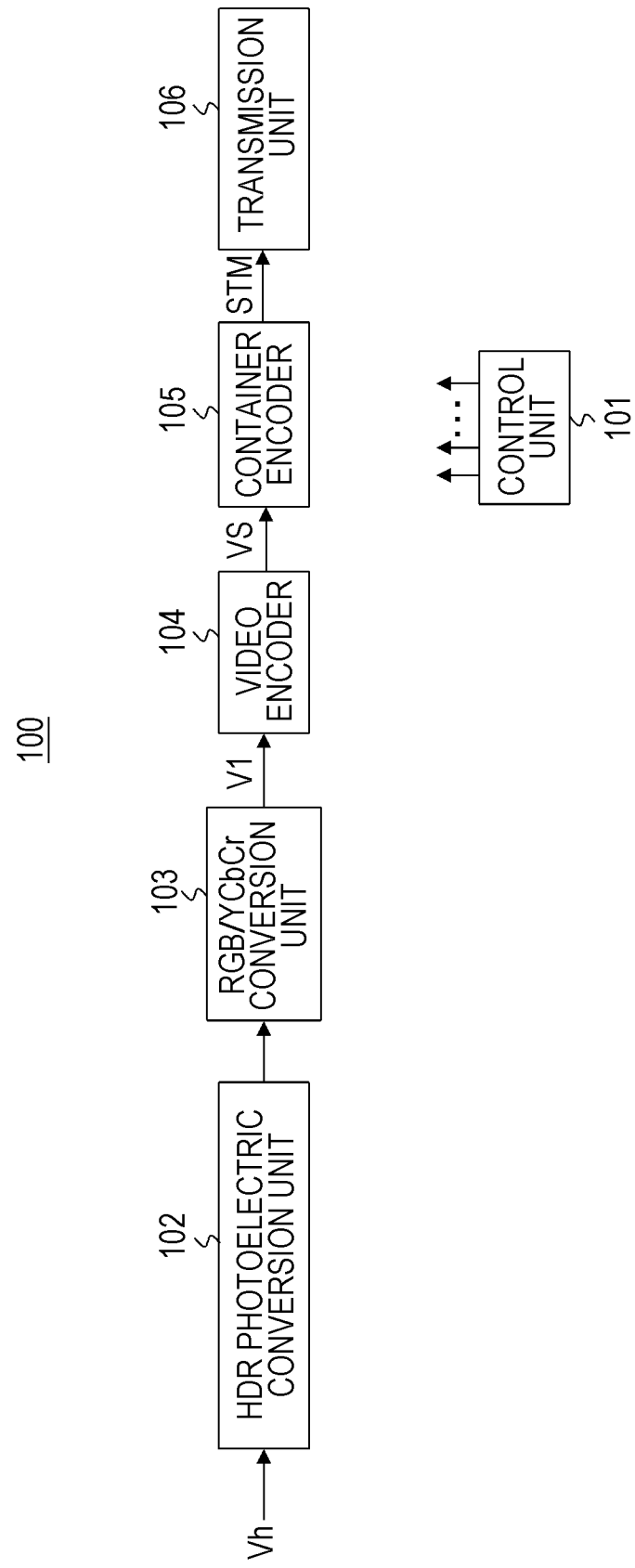

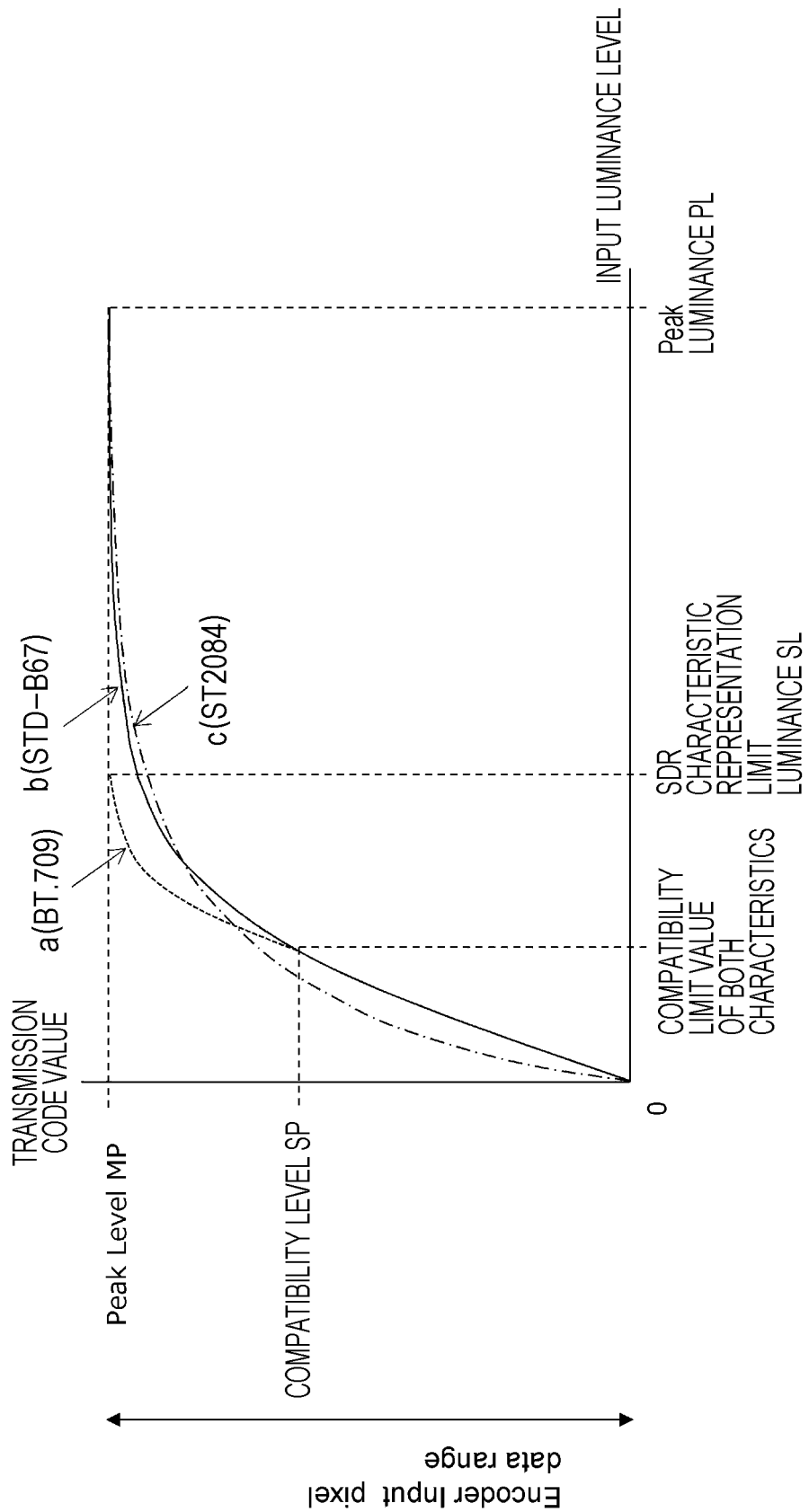

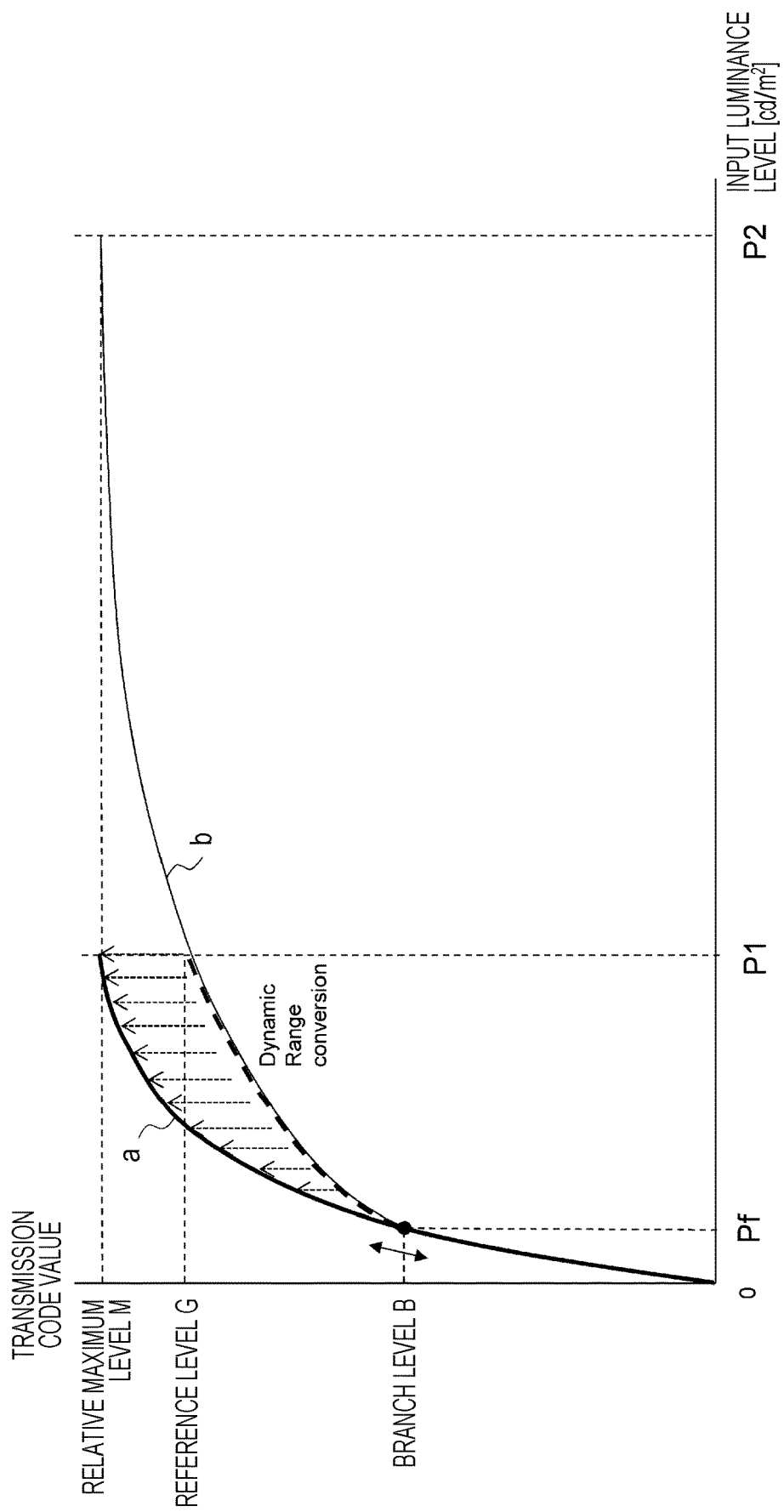

SEI ARRANGEMENT EXAMPLE AS HEVC ENCODED STREAM

FIG. 22

"Transfer_function SEI" Syntax (a)

| Syntax | No. of Bits | Format |
|---|---|---|
| Transfer_function SEI ( ) { | | |
| transferfunction | 8 | uimsbf |
| peak_luminance | 16 | uimsbf |
| color_space | 8 | uimsbf |
| } | | |

(b)

transferfunction (*)
"1"   BT.709-5 Transfer Function (SDR)
"14"  10bit BT.2020 Transfer Function (SDR)
"16"  SMPTE 2084 Transfer Function (HDR1)
"18"  ARIB STD B-67 Transfer Function (HDR2)

peak_luminance    INDICATE MAXIMUM LUMINANCE LEVEL color_space       COLOR SPACE INFORMATION (*) IN A CASE WHERE VALUE OF THIS ELEMENT DIFFERS FROM VALUE OF transfer function OF VUI, REPLACEMENT IS PERFORMED WITH VALUE OF THIS ELEMENT.

FIG. 23

Dynamic_range_conv SEI syntax

| Syntax | No. of Bits | Format |
|---|---|---|
| Dynamic_range_conv SEI ( ) { | | |
|   Dynamic_range_conv_id | ue(v) | |
|   Dynamic_range_conv_cancel_flag | u(1) | bmlbf |
|   if( ! Dynamic_range_conv_cancel_flag ) { | | |
|     coded_bit_depth | 8 | uimsbf |
|     reference_level | 14 | uimsbf |
|     ratio_conversion_flag | 1 | bslbf |
|     conversion_table_flag | 1 | bslbf |
|     branch_level | 16 | uimsbf |
|     if( ratio_conversion_flag ) { | | |
|       level_conversion_ratio | 8 | uimsbf |
|     } | | |
|     if (conversion_table_flag) { | | |
|       table_size | 16 | uimsbf |
|       for ( l = 0; l < table_size ; l++ ) { | 8 | uimsbf |
|         level_R[l] | 16 | uimsbf |
|         level_G[l] | 16 | uimsbf |
|         level_B[l] | 16 | uimsbf |
|       } | | |
|     } | | |
|   } | | |
| } | | |

FIG. 24

| semantics | |
|---|---|
| coded_data_bit_depth | ENCODED PIXEL BIT DEPTH |
| reference_level | REFERENCE LUMINANCE LEVEL VALUE |
| branch_level | BRANCH LEVEL |
| ratio_conversion_flag | INDICATE THAT SIMPLE CONVERSION IS PERFORMED |
| conversion_table_flag | INDICATE THAT IT IS BASED ON CONVERSION TABLE |
| level_conversion_ratio | INDICATE RATIO OF LEVEL CONVERSION |
| table_size | INDICATE NUMBER OF INPUTS IN CONVERSION TABLE |
| level_R[i] | INDICATE VALUE AFTER CONVERSION OF Red component |
| level_G[i] | INDICATE VALUE AFTER CONVERSION OF Green component |
| level_B[i] | INDICATE VALUE AFTER CONVERSION OF Blue component |

TRANSMISSION DEVICE, TRANSMISSION METHOD, RECEPTION DEVICE AND RECEPTION METHOD

CROSS-REFERENCE TO RELATED APPLICATIONS

This application is a continuation of U.S. application Ser. No. 17/457,848, filed on Dec. 6, 2021, which is a continuation of U.S. application Ser. No. 16/930,011, filed on Jul. 15, 2020, now U.S. Pat. No. 11,223,859, issued Jan. 11, 2022, which is a continuation of U.S. application Ser. No. 16/072,542, filed on Jul. 25, 2018, which is now U.S. Pat. No. 10,764,615, issued Sep. 1, 2020, which is a National Stage of PCT/JP2017/004146, filed on Feb. 6, 2017, and claims the benefit of priority under 35 U.S.C. § 119 of Japanese Application No. 2016-023185, filed Feb. 9, 2016, the contents of which is incorporated by reference herein in its entirety.

TECHNICAL FIELD

The present technology relates to a transmission device, a transmission method, a reception device, and a reception method, and more specifically relates to a transmission device and the like that transmit high-frame-rate ultra-high-definition image data.

BACKGROUND ART

It is considered that in a reception environment in which a fixed receiver and a mobile receiver share the same transmission band, the overall bit rate can be reduced by sharing a stream between an image service (video service) intended for a fixed receiver whose definition is regarded to be high and an image service intended for a mobile receiver whose definition is regarded to be moderate, compared to a so-called simulcast service that separately performs a service for the fixed receiver and a service for the mobile receiver. For example, Patent Document 1 describes that media encoding is scalably performed to generate a stream of a base layer for a low definition image service and a stream of an enhancement layer for a high definition image service, and a broadcast signal including the streams is transmitted.

CITATION LIST

Patent Document

Patent Document 1: Japanese Patent Application National Publication (Laid-Open) No. 2008-543142

SUMMARY OF THE INVENTION

Problems to be Solved by the Invention

An object of the present technology is to achieve convenience in performing processing depending on decoding capability in a reception side.

Solutions to Problems

The concept of the present technology is in
a transmission device including:
an image processing unit that processes high-frame-rate ultra-high-definition image data to obtain first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high-definition image by being used with the first to third image data;
a transmission unit that transmits a container including a predetermined number of video streams including encoded image data of the first to fourth image data; and
an information insertion unit that inserts information into the container, the information corresponding to information that is inserted into each of the predetermined number of video streams and associated with image data included in the video streams.

In the present technology, high-frame-rate ultra-high-definition image data is processed by the image processing unit, and first to fourth image data are obtained. The first image data is image data for acquisition of a base-frame-rate high-definition image. The second image data is image data for acquisition of a high-frame-rate high-definition image by being used with the first image data. The third image data is image data for acquisition of base-frame-rate ultra-high-definition image by being used with the first image data. The fourth image data is image data for acquisition of high-frame-rate ultra-high-definition image by being used with the first to third image data.

A container including a predetermined number of video streams including encoded image data of the first to fourth image data is transmitted by the transmission unit. Information is inserted into the container by the information transmission unit, the information corresponding to information that is inserted into each of the predetermined number of video streams and associated with image data included in the video streams.

For example, it is preferable that the container transmitted by the transmission unit includes a first video stream including encoded image data of the first image data and encoded image data of the second image data, and a second video stream including encoded image data of the third image data and encoded image data of the fourth image data, and the information insertion unit inserts the information into the container in a state in which the first and second video streams are each managed with one track. In a case where the container is of MP4 (ISOBMFF), information is arranged associated with the encoded image data of two image data included in the video stream, in a "moof" block existing in correspondence with the track.

In this case, the number of video streams (files) is two and the container becomes simple. A container analysis unit (demultiplexer) of a base-frame-rate receiver, for example, a 60P receiver, needs to read a 120P stream and skip an unnecessary picture. On the other hand, a high-frame-rate receiver, for example, a 120P receiver, only needs to decode a picture of the 120P stream as it is without doing anything extra.

In this case, for example, it is preferable that the information insertion unit, when inserting the information into the container, performs insertion by grouping information associated with the encoded image data of the first image data and information associated with the encoded image data of the second image data, for the first video stream, and performs insertion by grouping information associated with the encoded image data of the third image data and information associated with the encoded image data of the fourth image data, for the second video stream. Grouping is performed as described above, whereby it becomes possible to easily determine to which encoded image data each information relates, in the reception side.

In addition, in this case, for example, it is preferable that a picture of the first image data and a picture of the second image data are encoded alternately, that is, alternately in chronological order, in the first video stream, and a picture of the third image data and a picture of the fourth image data are encoded alternately, that is, alternately in chronological order, in the second video stream. Encoding is performed as described above, whereby it becomes possible to smoothly perform decoding processing of each picture, in the reception side. In addition, encoding is alternately performed as described above, whereby it guarantees that decoding processing is possible within a range of decoding capability in a receiver that decodes only the first image data or only the first image data and the third image data.

In addition, for example, it is preferable that the container transmitted by the transmission unit includes a first video stream including encoded image data of the first image data and encoded image data of the second image data, and a second video stream including encoded image data of the third image data and encoded image data of the fourth image data, and the information insertion unit inserts the information into the container in a state in which the first and second video streams are each managed with two tracks. In a case where the container is of MP4 (ISOBMFF), a "moof" block exists for each track, and information is arranged associated with one of the encoded image data of the two image data included in the video stream.

In this case, the number of video streams (files) is two and the container becomes simple. A container analysis unit (demultiplexer) of a base-frame-rate receiver, for example, a 60P receiver, needs to read a 120P stream and skip an unnecessary picture. On the other hand, a high-frame-rate receiver, for example, a 120P receiver, only needs to decode a picture of the 120P stream as it is without doing anything extra.

In this case, for example, it is preferable that a picture of the first image data and a picture of the second image data are encoded alternately, that is, alternately in chronological order, in the first video stream, and a picture of the third image data and a picture of the fourth image data are encoded alternately, that is, alternately in chronological order, in the second video stream. Encoding is performed as described above, whereby it becomes possible to smoothly perform decoding processing of each picture, in the reception side. In addition, encoding is alternately performed as described above, whereby it guarantees that decoding processing is possible within a range of decoding capability in a receiver that decodes only the first image data or only the first image data and the third image data.

In addition, for example, it is preferable that the container transmitted by the transmission unit includes a first video stream including encoded image data of the first image data, a second video stream including encoded image data of the second image data, a third video stream including encoded image data of the third image data, and a fourth video stream including encoded image data of the fourth image data, and the information insertion unit inserts the information in a state in which the first to fourth video streams are each managed with one track. In a case where the container is of MP4 (ISOBMFF), information is arranged associated with the encoded image data of one image data included in the video stream, in a "moof" block existing in correspondence with the track.

In this case, the number of video streams (files) is four. A base-frame-rate receiver, for example, a 60P receiver, guarantees so-called downward compatibility of reading a 60P stream and transferring the 60P stream to a decoder without any extra awareness. On the other hand, a high-frame-rate receiver, for example, a 120P receiver, needs to combine two streams and make one stream in the decoding order to transfer the stream to the decoder.

As described above, in the present technology, information is inserted into the container, the information corresponding to information that is inserted into each of the predetermined number of video streams and associated with image data included in the video streams. Therefore, in the reception side, it becomes easily possible to perform decoding processing by extracting predetermined encoded image data from the first to fourth image data included in the predetermined number of streams, on the basis of the information, depending on decoding capability.

Note that, in the present technology, for example, it is preferable that the high-frame-rate ultra-high-definition image data is transmission image data having a high-dynamic-range photoelectric conversion characteristic given by performing photoelectric conversion by the high-dynamic-range photoelectric conversion characteristic on high-dynamic-range image data, and the information insertion unit further inserts conversion characteristic information indicating the high-dynamic-range photoelectric conversion characteristic or an electro-optical conversion characteristic corresponding to the high-dynamic-range photoelectric conversion characteristic, into a video stream including encoded image data of the first image data. For example, it is preferable that the high-dynamic-range photoelectric conversion characteristic is a characteristic of Hybrid Log-Gamma. In addition, for example, it is preferable that the high-dynamic-range photoelectric conversion characteristic is a characteristic of a PQ curve. The conversion characteristic information is inserted as described above, whereby it becomes easily possible to perform appropriate electro-optical conversion on the basis of the conversion characteristic information, in the reception side.

In this case, for example, when the high-dynamic-range photoelectric conversion characteristic is the characteristic of the PQ curve, it is preferable that the information insertion unit further inserts conversion information for conversion of a value of conversion data by the characteristic of the PQ curve to a value of conversion data by a standard-dynamic-range photoelectric conversion characteristic, into the video stream including the encoded image data of the first image data. The conversion information is inserted as described above, whereby it becomes possible to satisfactorily obtain display image data in a case where standard-dynamic-range display is performed, in the reception side.

In addition, another concept of the present technology is in
 a reception device including
 a reception unit that receives a container including a predetermined number of video streams, in which
 the predetermined number of video streams includes first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high-definition image by being used with the first to third image data that are obtained by processing high-frame-rate ultra-high-definition image data, information is inserted into the container, the information corresponding to information that is inserted into each of the predetermined number of video streams and associated with image data included in the video streams, and the reception device further includes a processing unit that obtains image data by selectively extracting predetermined encoded image data from encoded image data of the first to fourth image data and performing decoding processing, on the basis of the information inserted into the container, depending on decoding capability.

In the present technology, a container including a predetermined number of video streams is received by the reception unit. The predetermined number of video streams includes encoded image data of the first to fourth image data obtained by processing high-frame-rate ultra-high-definition image data. The first image data is image data for acquisition of a base-frame-rate high-definition image. The second image data is image data for acquisition of a high-frame-rate high-definition image by being used with the first image data. The third image data is image data for acquisition of base-frame-rate ultra-high-definition image by being used with the first image data. The fourth image data is image data for acquisition of high-frame-rate ultra-high-definition image by being used with the first to third image data.

Information is inserted into the container, the information corresponding to information that is inserted into each of the predetermined number of video streams and associated with image data included in the video streams. Predetermined encoded image data is selectively extracted from the encoded image data of the first to fourth image data, decoding processing is performed, and image data is obtained, on the basis of the information inserted into the container, depending on decoding capability, by the processing unit.

As described above, in the present technology, information is inserted into the container, the information corresponding to information that is inserted into each of the predetermined number of video streams and associated with image data included in the video streams, and predetermined encoded image data is selectively extracted from the encoded image data of the first to fourth image data and decoding processing is performed, on the basis of the information inserted into the container, depending on decoding capability. Therefore, it becomes possible to easily perform decoding processing depending on decoding capability.

Note that, in the present technology, for example, it is preferable that the high-frame-rate ultra-high-definition image data is transmission image data having a high-dynamic-range photoelectric conversion characteristic given by performing photoelectric conversion by the high-dynamic-range photoelectric conversion characteristic on high-dynamic-range image data, conversion characteristic information indicating the high-dynamic-range photoelectric conversion characteristic or an electro-optical conversion characteristic corresponding to the high-dynamic-range photoelectric conversion characteristic is inserted into a video stream including the encoded image data of the first image data, and the processing unit obtains display image data by performing electro-optical conversion on the image data obtained by the decoding processing on the basis of the conversion characteristic information. Electro-optical conversion is performed on the basis of the conversion characteristic information as described above, whereby it becomes easily possible to perform appropriate electro-optical conversion.

In addition, in the present technology, for example, it is preferable that the high-frame-rate ultra-high-definition image data is transmission image data having a high-dynamic-range photoelectric conversion characteristic given by performing photoelectric conversion by the high-dynamic-range photoelectric conversion characteristic on high-dynamic-range image data, the high-dynamic-range photoelectric conversion characteristic is a characteristic of a PQ curve, conversion information for conversion of a value of conversion data by the characteristic of the PQ curve to a value of conversion data by a standard-dynamic-range photoelectric conversion characteristic is inserted into the video stream including the encoded image data of the first image data, and the processing unit, when performing standard-dynamic-range display, obtains standard-dynamic-range transmission image data by performing dynamic range conversion on the image data obtained by the decoding processing on the basis of the conversion information, and obtains display image data by performing electro-optical conversion by a standard-dynamic-range electro-optical conversion characteristic on the standard-dynamic-range transmission image data. As a result, it becomes possible to satisfactorily obtain display image data in a case where standard-dynamic-range display is performed.

In addition, another concept of the present technology is in a transmission device including:

an image processing unit that processes high-frame-rate image data to obtain first image data for acquisition of a base-frame-rate image and second image data for acquisition of high-frame-rate image data by being used with the first image data;

a transmission unit that transmits a container including at least one video stream including encoded image data of the first and second image data; and an information insertion unit that inserts a level specification value of a video stream corresponding to the encoded image data of the first image data in correspondence with the encoded image data of the first image data, and inserts a level specification value of a video stream obtained by combining the encoded image data of the first and second image data in correspondence with the encoded image data of the second image data, into the container.

In the present technology, high-frame-rate image data is processed by the image processing unit, and first image data for acquisition of a base-frame-rate image and second image data for acquisition of high-frame-rate image data by being used with the first image data are obtained. A container including at least one video stream including encoded image data of the first and second image data is transmitted by the transmission unit.

Then, a level specification value of a video stream corresponding to the encoded image data of the first image data is inserted in correspondence with the encoded image data of the first image data, and a level specification value of a video stream obtained by combining the encoded image data of the first and second image data is inserted in correspondence with the encoded image data of the second image data, into the container, by the information insertion unit.

As described above, in the present technology, the level specification value of the video stream is inserted into the container, whereby it becomes possible to selectively transfer, to a decoder, encoded image data depending on decoding capability from the encoded image data of the first and second image data and process the encoded image data, on the basis of the information of the level specification value of the video stream, in the reception side.

In addition, another concept of the present technology is in a reception device including:
a reception unit that receives a container including at least one video stream, in which
the at least one video stream includes first image data for acquisition of a base-frame-rate image and second image data for acquisition of high-frame-rate image data by being used with the first image data,
into the container, a level specification value of a video stream corresponding to the encoded image data of the first image data is inserted in correspondence with the encoded image data of the first image data, and a level specification value of a video stream obtained by combining the encoded image data of the first and second image data is inserted in correspondence with the encoded image data of the second image data, and
the reception device further includes a processing unit that obtains image data by selectively extracting at least one encoded image data from encoded image data of the first and second image data and performing decoding processing, on the basis of the level specification value of the video stream inserted into the container, depending on decoding capability.

In the present technology, a container including at least one video stream is received by the reception unit. Here, the at least one video stream includes first image data for acquisition of a base-frame-rate image and second image data for acquisition of high-frame-rate image data by being used with the first image data.

In addition, a level specification value of a video stream corresponding to the encoded image data of the first image data is inserted in correspondence with the encoded image data of the first image data, and a level specification value of a video stream obtained by combining the encoded image data of the first and second image data is inserted in correspondence with the encoded image data of the second image data, into the container.

At least one encoded image data is selectively extracted from the encoded image data of the first and second image data, decoding processing is performed, and image data is obtained, on the basis of the level specification value of the video stream inserted into the container, depending on decoding capability, by the processing unit.

As described above, in the present technology, on the basis of information of the level specification value of the video stream inserted into the container, encoded image data depending on decoding capability is selectively transferred to a decoder from the encoded image data of the first and second image data and is processed, and it becomes possible to efficiently perform processing in the decoder.

Effects of the Invention

With the present technology, convenience can be achieved in performing processing depending on decoding capability in the reception side. Note that, the advantageous effects described in this specification are merely examples, and the advantageous effects of the present technology are not limited to them and may include additional effects.

BRIEF DESCRIPTION OF DRAWINGS

FIG. 8 is a diagram illustrating examples of SPS (VPS) elements.

FIG. 9 is a diagram schematically illustrating an example of control information in a "moof (moof 0)" box in the transmission of Case 1.

FIG. 10 is a diagram schematically illustrating an example of control information in a "moof (moof 1)" box in the transmission of Case 1.

FIG. 12 is a diagram schematically illustrating an example of control information in boxes of "moof (moof 0)" and "moof (moof 1)" in the transmission of Case 2.

FIG. 13 is a diagram schematically illustrating an example of control information in boxes of "moof (moof 2)" and "moof (moof 3)" in the transmission of Case 2.

FIG. 15 is a diagram illustrating a description example of an MPD file in a case of transmission of a two-stream configuration (in the cases of Case 1 and Case 2).

FIG. 16 is a diagram illustrating "Value" semantics of "SupplementaryDescriptor".

FIG. 17 is a diagram illustrating a description example of an MPD file in a case of transmission of a four-stream configuration (in the cases of Case 1 and Case 2).

FIG. 18 is a block diagram illustrating an example configuration of a service transmission system.

FIG. 19 is a diagram for describing an HDR photoelectric conversion characteristic.

FIG. 20 is a diagram for describing conversion information of dynamic range conversion.

FIG. 22 is a diagram illustrating an example structure of a transfer function SEI message and details of main information in the example structure.

FIG. 23 is a diagram illustrating an example structure of a dynamic range conversion SEI message.

FIG. 24 is a diagram illustrating details of main information in the example structure of the dynamic range conversion SEI message.

MODE FOR CARRYING OUT THE INVENTION

The following is a description of a mode for carrying out the invention (hereinafter referred to as the "embodiment"). Note that, description will be made in the following order.
1. Embodiment
2. Modification

1. EMBODIMENT

[Overview of MPEG-DASH Based Stream Distribution System]

First, an overview of an MPEG-DASH based stream distribution system to which the present technology can be applied will be described.

Figure 1:
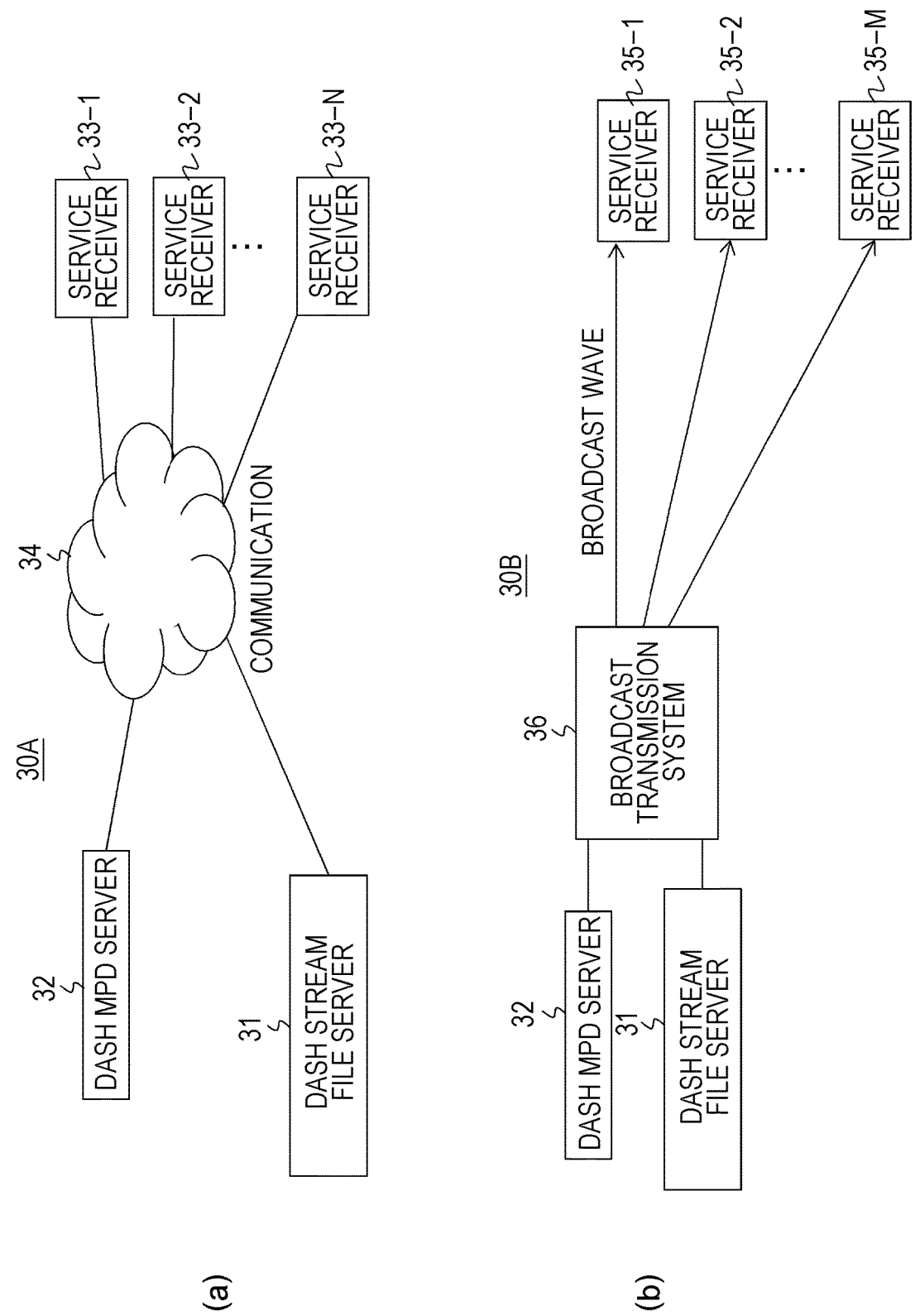
FIG. 1 is a block diagram illustrating an example configuration of an MPEG-DASH based stream distribution system.

FIG. 1(a) illustrates an example configuration of an MPEG-DASH based stream distribution system 30A. In the example configuration, a media stream and an MPD file are transmitted through a communication network transmission path (communication transmission path). The stream distribution system 30A has a configuration in which N service receivers 33-1, 33-2, . . . , 33-N are connected to a DASH stream file server 31 and a DASH MPD server 32 via a Content Delivery Network (CDN) 34.

The DASH stream file server 31 generates a stream segment of the DASH specification (hereinafter referred to as "DASH segment" as appropriate) on the basis of media data (video data, audio data, subtitle data, and the like) of a predetermined content, and transmits the segment in response to an HTTP request from each of the service receivers. The DASH stream file server 31 may be a server dedicated to streaming, or may be substituted by a web server.

In addition, in response to a request of a segment of a predetermined stream transmitted from a service receiver 33 (33-1, 33-2, . . . , 33-N) via the CDN 34, the DASH stream file server 31 transmits the segment of the stream to a requesting receiver via the CDN 34. In this case, the service receiver 33 refers to a value of a rate described in a Media Presentation Description (MPD) file, selects a stream of an optimum rate, and makes a request, depending on a state of a network environment where the client is located.

The DASH MPD server 32 is a server that generates an MPD file for acquiring the DASH segment generated in the DASH stream file server 31. On the basis of content metadata from a content management server (not illustrated) and an address (url) of the segment generated in the DASH stream file server 31, the MPD file is generated. Note that, the DASH stream file server 31 and the DASH MPD server 32 may be physically the same server.

In an MPD format, each attribute is described by using an element called Representation for each stream such as video and audio. For example, in the MPD file, the Representation is divided for each of a plurality of video data streams with different rates, and each rate is described. In the service receiver 33, with reference to a value of the rate, the optimum stream can be selected, depending on the state of the network environment where the service receiver 33 is located, as described above.

FIG. 1(b) illustrates an example configuration of an MPEG-DASH based stream distribution system 30B. In the example configuration, a media stream and an MPD file are transmitted through an RF transmission path (broadcast transmission path). The stream distribution system 30B includes a broadcast transmission system 36 to which the DASH stream file server 31 and the DASH MPD server 32 are connected, and M service receivers 35-1, 35-2, . . . , 35-M.

In the case of the stream distribution system 30B, the broadcast transmission system 36 transmits the stream segment of the DASH specification (DASH segment) generated in the DASH stream file server 31 and the MPD file generated in the DASH MPD server 32 on a broadcast wave.

Figure 2:
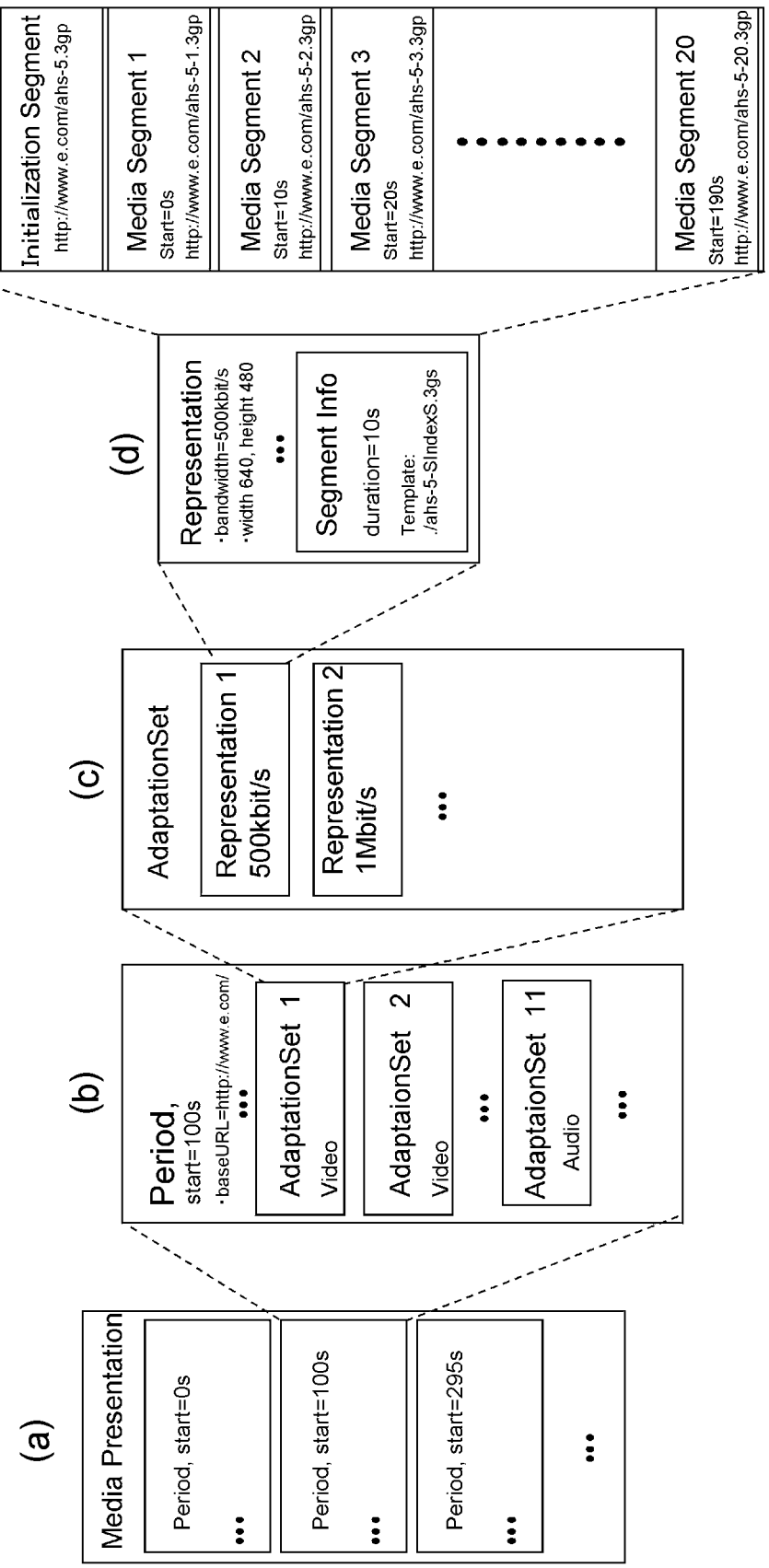
FIG. 2 is a diagram illustrating an example of a relationship between structures arranged hierarchically in an MPD file.

FIG. 2 illustrates an example of a relationship between structures arranged hierarchically in the MPD file. As illustrated in FIG. 2(a), in a Media Presentation as an entire MPD file, there is a plurality of Periods delimited by time intervals. For example, the first Period starts from 0 seconds, the next Period starts from 100 seconds, and so on.

As illustrated in FIG. 2(b), there is a plurality of AdaptationSets in the Period. AdaptationSets depend on differences in media types such as video and audio, and differences in languages, differences in viewpoints, and the like even on the same media type. As illustrated in FIG. 2(c), there is a plurality of Representations in the AdaptationSet. Representations depend on stream attributes, such as differences in rates.

As illustrated in FIG. 2(d), a Representation includes SegmentInfo. In the SegmentInfo, as illustrated in FIG. 2(e), there are an Initialization Segment, and a plurality of Media Segments in which information for each Segment obtained by delimiting the Period more finely is described. In the Media Segment, there is information of an address (url) for actual acquisition of segment data such as video and audio, or the like.

Note that, between the plurality of Representations included in the AdaptationSet, stream switching can be performed freely. As a result, depending on the state of the network environment of the reception side, the stream of the optimum rate can be selected, and uninterrupted video distribution can be achieved.

[Example Configuration of Transmission/Reception System]

Figure 3:
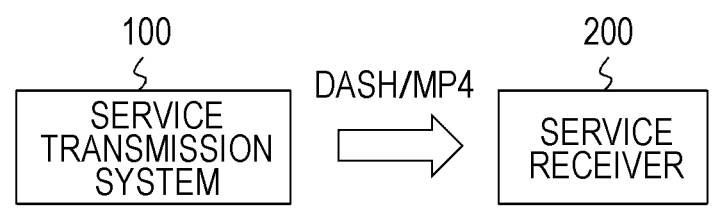
FIG. 3 is a block diagram illustrating an example configuration of a transmission/reception system as an embodiment.

FIG. 3 illustrates an example configuration of a transmission/reception system 10 as an embodiment. The transmission/reception system 10 includes a service transmission system 100 and a service receiver 200. In the transmission/reception system 10, the service transmission system 100 corresponds to the DASH stream file server 31 and the DASH MPD server 32 of the stream distribution system 30A illustrated in FIG. 1(a). In addition, in the transmission/reception system 10, the service transmission system 100 corresponds to the DASH stream file server 31, the DASH MPD server 32, and the broadcast transmission system 36 of the stream distribution system 30B illustrated in FIG. 1(b).

In addition, in the transmission/reception system 10, the service receiver 200 corresponds to the service receiver 33 (33-1, 33-2, . . . , 33-N) of the stream distribution system 30A illustrated in FIG. 1(a). In addition, in the transmission/reception system 10, the service receiver 200 corresponds to a service receiver 35 (35-1, 35-2, . . . , 35-M) of the stream distribution system 30B illustrated in FIG. 1(b).

The service transmission system 100 transmits DASH/MP4, that is, MP4 as a container including an MPD file as a metafile and a media stream (Media Segment) such as video or audio, through the communication network transmission path (see FIG. 1(a)) or the RF transmission path (see FIG. 1(b)).

Figure 4:
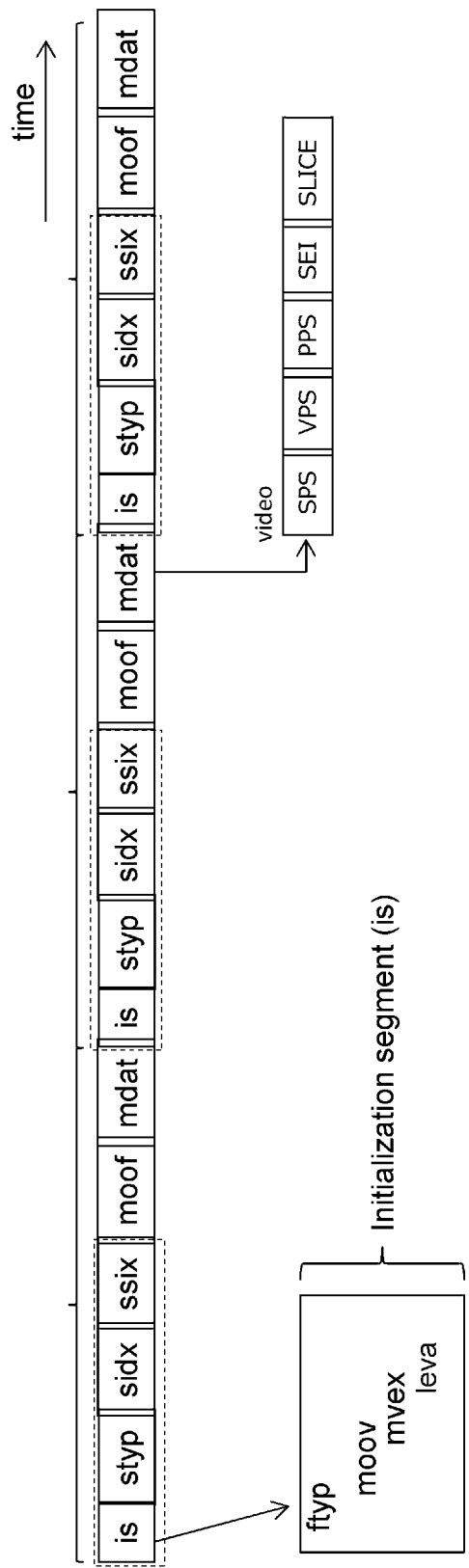
FIG. 4 is a diagram illustrating an example of an MP4 stream transmitted through a communication network transmission path or an RF transmission path.

FIG. 4 illustrates an example of an MP4 stream transmitted through the communication network transmission path or the RF transmission path. The entire service stream is fragmented and transmitted so that images and sounds come out from the middle of transmission in general broadcasting and the like. In this case, as illustrated in the figure, starting from an initialization segment (IS), followed by boxes of "styp", "Segment index box (sidx)", "Sub-segment index box (ssix)", "Movie frgment box (moof)", and "Media data box (mdat)".

The initialization segment (IS) has a Box structure based on the ISO Base Media File Format (ISOBMFF). At the head, a "ftyp" box indicating a file type is arranged, followed by a "moov" box for control. Although detailed description is omitted, various boxes including a "mvex" box are included in the "moov" box. Then, a "leva" box is arranged in the "mvex" box. In the "leva" box, an assignment is defined of a Level defined by "temporal_layerID", and grouping of pictures is performed at each Level, or an individual track is assigned to a Level.

The "styp" box includes segment type information. The "sidx" box includes range information of each track, positions of "moof"/"mdat" are indicated, and positions of samples (pictures) in "mdat" are also indicated. The "ssix" box includes division information of the tracks, and I/P/B types are classified.

The "moof" box includes control information. The "mdat" box includes entities of signals (transmission media) themselves, such as video and audio. The "mdat" box and the "mdat" box constitute a Movie Fragment. The "mdat" box of one Movie Fragment includes a fragment obtained by fragmentation of the transmission medium, so that the control information included in the "moof" box is control information associated with the fragment. As the size of the fragment, for example, a Group Of Picture (GOP) of MPEG Video or the like is assumed.

In the embodiment, the media stream includes a predetermined number of video streams obtained by processing high-frame-rate (HFR) ultra-high-definition (UHD) image data (moving image data). In the embodiment, the high-frame-rate ultra-high-definition image data is, for example, 120 P 4 K/8 K image data.

The predetermined number of video streams includes the encoded image data of the first to fourth image data. The first image data is base layer image data for acquisition of a base-frame-rate (normal-frame-rate) high-definition image. The second image data is base layer image data for acquisition of a high-frame-rate high-definition image by being used with the first image data. The third image data is scalable layer image data for acquisition of a base-frame-rate ultra-high-definition image by being used with the first image data. The fourth image data is scalable layer image data for acquisition of a high-frame-rate ultra-high-definition image by being used with the first to third image data.

For example, the first to fourth image data are obtained as follows. That is, the first image data is obtained by applying down-scaling processing to fifth image data obtained by extracting each of the first pictures by down-sampling from two consecutive picture units in the high-frame-rate ultra-high-definition image data. Note that, each of the first pictures extracted here may be mixed with the second picture at a predetermined ratio. In addition, the second image data is obtained by applying down-scaling processing to a sixth image data obtained by extracting each of the second pictures by down-sampling from two consecutive pictures in the high-frame-rate ultra-high-definition image data. Note that, each of the second pictures extracted here may be mixed with the first picture at a predetermined ratio.

In addition, the third image data is obtained by subtraction between a seventh image data obtained by applying up-scaling processing to the first image data and the fifth image data. In addition, the fourth image data is obtained by subtraction between an eighth image data obtained by applying up-scaling processing to the second image data and the sixth image data.

Information is inserted into the MP4 as the container, the information corresponding to information that is inserted into each of the predetermined number of video streams and associated with image data included in the video streams. For example, the information associated with the image data included in the video streams is information such as "general_level_idc", "general_profile_idc", "sublayer_level_idc", and "sublayer_profile_idc" included in sequence Parameter Set (SPS), and the information corresponding to these pieces of information is arranged in a "moof" block.

Here, consideration is made on three cases of Case 1, Case 2, and Case 3 where the number of video streams (video files) and the number of tracks for managing each video stream differ from each other.

"Case 1"

The MP4 includes a first video stream including encoded image data of the first and second image data that are the base layer image data, and a second video stream including encoded image data of the third and fourth image data that are the scalable layer image data, and the first and second video streams are each managed with one track.

In this case, a picture of the first image data and a picture of the second image data are encoded alternately in the first video stream, and a picture of the third image data and a picture of the fourth image data are encoded alternately in the second video stream. That is, a picture (sample) included in a base 60P and a picture (sample) included in an enhancement 60P are alternately encoded. Accordingly, values of the decoding time stamps and display time stamps of the pictures are assigned so that the base 60P and enhancement 60P are alternated.

In addition, in this case, information is arranged in a "moof" block existing in correspondence with the track, the information corresponding to information associated with encoded image data of two image data included in the video stream. That is, the information is arranged in a state in which the first and second video streams are each managed with one track. Then, in this case, information associated with the encoded image data of the first image data and information associated with the encoded image data of the second image data are grouped and inserted for the first video stream, and the information associated with the encoded image data of the third image data and the information associated with the encoded image data of the fourth image data are grouped and inserted for the second video stream.

"Case 2"

The MP4 includes the first video stream including the encoded image data of the first and second image data that are the base layer image data, and the second video stream including the encoded image data of the third and fourth image data that are the scalable layer image data, and the first and second video streams are each managed with two tracks.

In this case, a picture of the first image data and a picture of the second image data are encoded alternately in the first video stream, and a picture of the third image data and a picture of the fourth image data are encoded alternately in the second video stream. That is, a picture (sample) included in a base 60P and a picture (sample) included in an enhancement 60P are alternately encoded. Accordingly, values of the decoding time stamps and display time stamps of the pictures are assigned so that the base 60P and enhancement 60P are alternated.

In addition, in this case, a "moof" block exists for each track, and information is arranged associated with one of the encoded image data of the two image data included in the video stream. That is, the information is arranged in a state in which the first and second video streams are each managed with two tracks.

"Case 3"

The MP4 includes a first video stream including the first encoded image data that is the base layer image data, a second video stream including the second encoded image data that is the base layer image data, a third video stream including the encoded image data of the third image data that is the scalable layer image data, and a fourth video stream including the encoded image data of the fourth image data that is the scalable layer image data, and the first to fourth video streams are each managed with different tracks.

In this case, information is arranged in a "moof" block existing in correspondence with each track, the information corresponding to information associated with encoded image data of one image data of the video stream. That is, the information is arranged in a state in which the first to fourth video streams are each managed with one track.

The high-frame-rate ultra-high-definition image data as a source of the first to fourth image data is, for example, transmission image data having a high-dynamic-range photoelectric conversion characteristic given by performing photoelectric conversion by the high-dynamic-range photoelectric conversion characteristic on high-dynamic-range image data. Conversion characteristic information indicating the high-dynamic-range photoelectric conversion characteristic or an electro-optical conversion characteristic corresponding to the high-dynamic-range photoelectric conversion characteristic is inserted into the video stream including the encoded image data of the first image data. The high-dynamic-range photoelectric conversion characteristics include a characteristic of Hybrid Log-Gamma, a characteristic of a PQ curve, or the like.

When the high-dynamic-range photoelectric conversion characteristic is the characteristic of the PQ curve, conversion information for conversion of a value of conversion data by the characteristic of the PQ curve to a value of conversion data by a standard-dynamic-range photoelectric conversion characteristic is inserted into the video stream including the encoded image data of the first image data.

The service receiver 200 receives the MP4 as the container described above transmitted from the service transmission system 100 through the communication network transmission path (see FIG. 1(a)) or the RF transmission path (see FIG. 1(b)). As described above, the MP4 includes the predetermined number of video streams including the encoded image data of the first to fourth image data. In addition, as described above, information is inserted into the MP4, the information corresponding to information that is inserted into each of the predetermined number of video streams and associated with image data included in the video streams.

The service receiver 200 obtains image data by selectively extracting predetermined encoded image data from the encoded image data of the first to fourth image data and performing decoding processing, on the basis of the information inserted into the MP4, depending on decoding capability.

For example, in the case of a receiver having a decoding capability capable of processing base-frame-rate high-definition image data, image data is obtained for display of a base-frame-rate high-definition image by selectively applying decoding processing to the encoded image data of the first image data. In addition, for example, in the case of a receiver having a decoding capability capable of processing high-frame-rate high-definition image data, image data is obtained for display of a high-frame-rate high-definition image by selectively applying decoding processing to the encoded image data of the first and second image data.

In addition, for example, in the case of a receiver having a decoding capability capable of processing base-frame-rate ultra-high-definition image data, image data is obtained for display of a base-frame-rate ultra-high-definition image by selectively applying decoding processing to the encoded image data of the first and third image data. In addition, for example, in the case of a receiver having a decoding capability capable of processing high-frame-rate ultra-high-definition image data, image data is obtained for display of a high-frame-rate ultra-high-definition image by applying decoding processing to the encoded image data of all the first to fourth image data.

In addition, when performing high-dynamic-range display, the service receiver 200 obtains high-dynamic-range display image data by performing high-dynamic-range electro-optical conversion on the image data obtained by the decoding processing, on the basis of the conversion characteristic information inserted into the MP4 or the video stream including the first image data.

In addition, when performing standard-dynamic-range display, in a case where the high-dynamic photoelectric conversion characteristic indicated by the conversion characteristic information is the characteristic of the Hybrid Log-Gamma curve, the service receiver 200 obtains standard-dynamic-range display image data by performing electro-optical conversion by a standard-dynamic-range electro-optical conversion characteristic directly on the image data obtained by the decoding processing.

In addition, when performing standard-dynamic-range display, in a case where the high-dynamic photoelectric conversion characteristic indicated by the conversion characteristic information is the characteristic of the PQ curve, the service receiver 200 obtains standard-dynamic-range transmission image data by performing dynamic range conversion on the image data obtained by the decoding processing on the basis of the conversion information inserted into the video stream including the first image data, and obtains standard-dynamic-range display image data by performing electro-optical conversion by the standard-dynamic-range electro-optical conversion characteristic on the standard-dynamic-range transmission image data.

Figure 5:
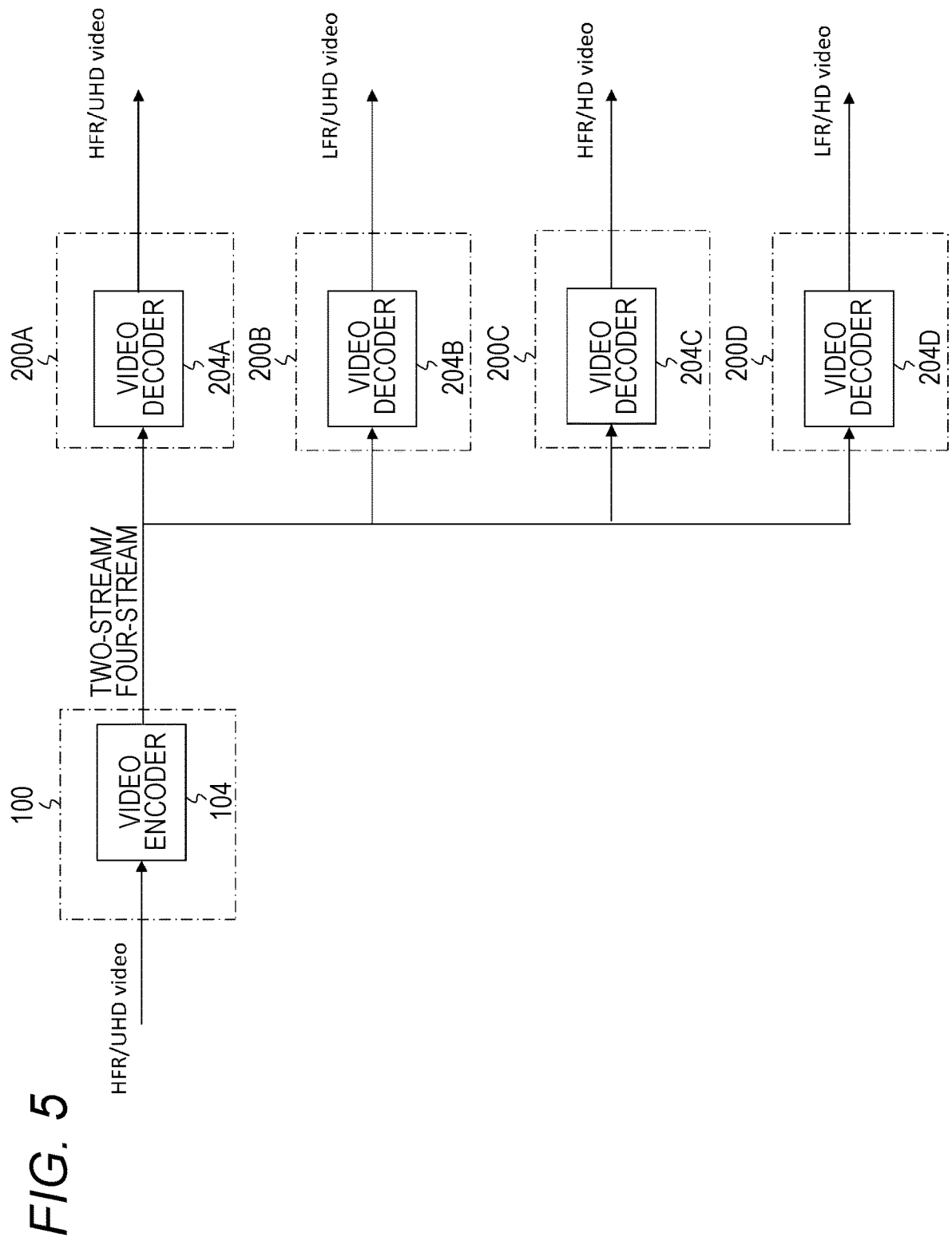
FIG. 5 is a diagram illustrating an overview of encoding/decoding processing in a service transmission system and a service receiver.

FIG. 5 illustrates an overview of encoding/decoding processing in the service transmission system 100 and the service receiver 200. High-frame-rate (HFR) ultra-high-definition (UHD) image data "HFR/UHD video" is input to a video encoder 104 of the service transmission system 100. In the video encoder 104, the image data "HFR/UHD video" is processed, and two video streams including the encoded image data of the first to fourth image data (in the cases of Case 1 and Case 2), or four video streams (in the case of Case 3) are obtained and transmitted.

In a service receiver 200A having a decoding capability capable of processing high-frame-rate ultra-high-definition image data, in a video decoder 204A, decoding processing is applied to the encoded image data of all the first to fourth image data, and image data "HFR/UHD video" is obtained for display of a high-frame-rate ultra-high-definition image.

In addition, in a service receiver 200B having a decoding capability capable of processing base-frame-rate ultra-high-definition image data, in a video decoder 204B, decoding processing is selectively applied to the encoded image data of the first and third image data, and image data "LFR/UHD video" is obtained for display of a base-frame-rate ultra-high-definition image.

In addition, in a service receiver 200C having a decoding capability capable of processing high-frame-rate high-definition image data, in a video decoder 204C, decoding processing is selectively applied to the encoded image data of the first and second image data, and image data "HFR/HD video" is obtained for display of a high-frame-rate high-definition image.

In addition, in a service receiver 200D having a decoding capability capable of processing base-frame-rate high-definition image data, in a video decoder 204D, decoding processing is selectively applied to the encoded image data of the first image data, and image data "LFR/HD video" is obtained for display of a base-frame-rate high-definition image.

Figure 6:
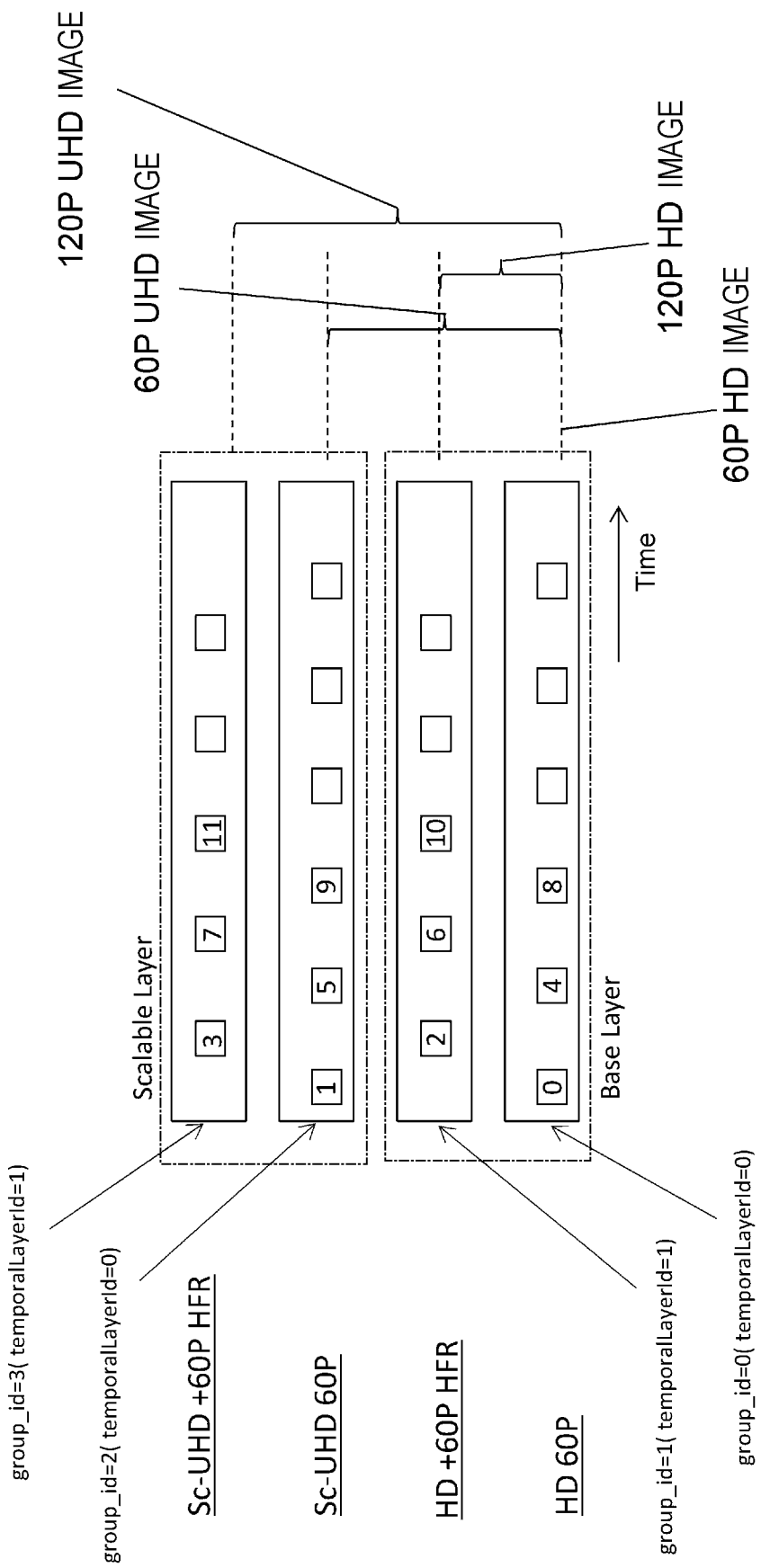
FIG. 6 is a diagram for describing first to fourth image data included in two or four video streams (video files).

FIG. 6 illustrates hierarchically the above-described first to fourth image data. In the illustrated example, a case is illustrated where the high frame rate is 120P. The horizontal axis indicates display order (picture order of composition: POC), and display time comes early in the left side and display time comes late in the right side. Each of rectangular frames indicates a picture.

First image data "HD 60P" that is the base layer image data exists in the lowermost row, and its group ID (group_id) is set to "0". The first image data is image data constituting the base 60P, and its temporal layer ID (TemporalLayerId) is set to "0".

In addition, second image data "HD +60P HFR" that is the base layer image data exists in the upper row of the first image data, and its group ID (group_id) is set to "1". The second image data is image data constituting the enhancement 60P for 120P image data, and its temporal layer ID (TemporalLayerId) is set to "1". The second image data is temporal scalability with respect to the first image data "HD 60P".

As described above, in Case 1 and Case 2, the first and second image data are transmitted as the same video stream (video file). By performing grouping by the group ID, in a case where only the base 60P is decoded, the group ID can be used as a criterion for determining which packet should be transmitted to the video decoder. In a case where both the base 60P and the enhancement 60 are decoded, packets of the base 60P and the enhancement 60P only need to be alternately transmitted to the video decoder.

In addition, third image data "Sc-UHD 60P" that is the scalable layer image data exists in the upper row of the second image data, and its group ID (group_id) is set to "2". The third image data is image data constituting the base 60P, and its temporal layer ID (TemporalLayerId) is set to "0". The third image data is spatial scalability with respect to the first image data "HD 60P".

In addition, fourth image data "Sc-UHD +60P HFR" that is the scalable layer image data exists in the upper row of the third image data, and its group ID (group_id) is set to "3". The fourth image data is image data constituting the enhancement 60P for 120P image data, and its temporal layer ID (TemporalLayerId) is set to "1". The fourth image data is temporal scalability with respect to the third image data "Sc-UHD 60P" and spatial scalability with respect to the second "HD +60P HFR".

As described above, in Case 1 and Case 2, the third and fourth image data are transmitted as the same video stream (video file). By performing grouping by the group ID, in a case where only the base 60P is decoded, the group ID can be used as a criterion for determining which packet should be transmitted to the decoder. In a case where both the base 60P and the enhancement 60 are decoded, packets of the base 60P and the enhancement 60P only need to be alternately transmitted to the video decoder.

On the basis of the first image data "HD 60P", it is possible to reproduce a base-frame-rate high-definition (HD) image (60P HD image). In addition, on the basis of the first image data "HD 60P" and the second "HD +60P HFR", it is possible to reproduce a high-frame-rate high-definition (HD) image (120P HD image).

In addition, on the basis of the first image data "HD 60P" and the third image data "Sc-UHD 60P", it is possible to reproduce a base-frame-rate ultra-high-definition (UHD) image (60P UHD image). In addition, on the basis of the first image data "HD 60P", the second image data "HD +60P HFR", the third image data "Sc-UHD 60P", and the fourth image data "Sc-UHD +60P HFR", it is possible to reproduce high-frame-rate ultra-high-definition (UHD) images (120P UHD images).

Note that, the numbers given to the rectangular frames indicating the pictures indicate the encoding order, and hence the decoding order. In a case where decoding processing is performed only on the encoded image data of the first image data, decoding is performed in the order of 0→4→8 . . . . In addition, in a case where decoding processing is performed on the first and second image data, decoding is performed in the order of 0→2→4→6 . . . . Furthermore, in a case where decoding processing is performed on the first and third image data, decoding is performed in the order of 0→1→4→5 . . . . Further, in a case where decoding processing is performed on the first to fourth image data, decoding is performed in the order of 0→1→2→3→4→5→ . . . . Regardless of an arrangement method of the first to fourth image data in the stream, in the case of broadcast distribution, the encoding order of the images is set in the order of 0→1→2→3→4→5→ . . . . With this setting, it is possible to minimize the delay from reception to display.

Regarding the encoding order in the stream, in a case where the first image data and the second image data are included in the same video stream, the picture of the first image data and the picture of the second image data are encoded alternately. Similarly, in a case where the third image data and the fourth image data are included in the same video stream, the picture of the third image data and the picture of the fourth image data are encoded alternately.

Figure 7:
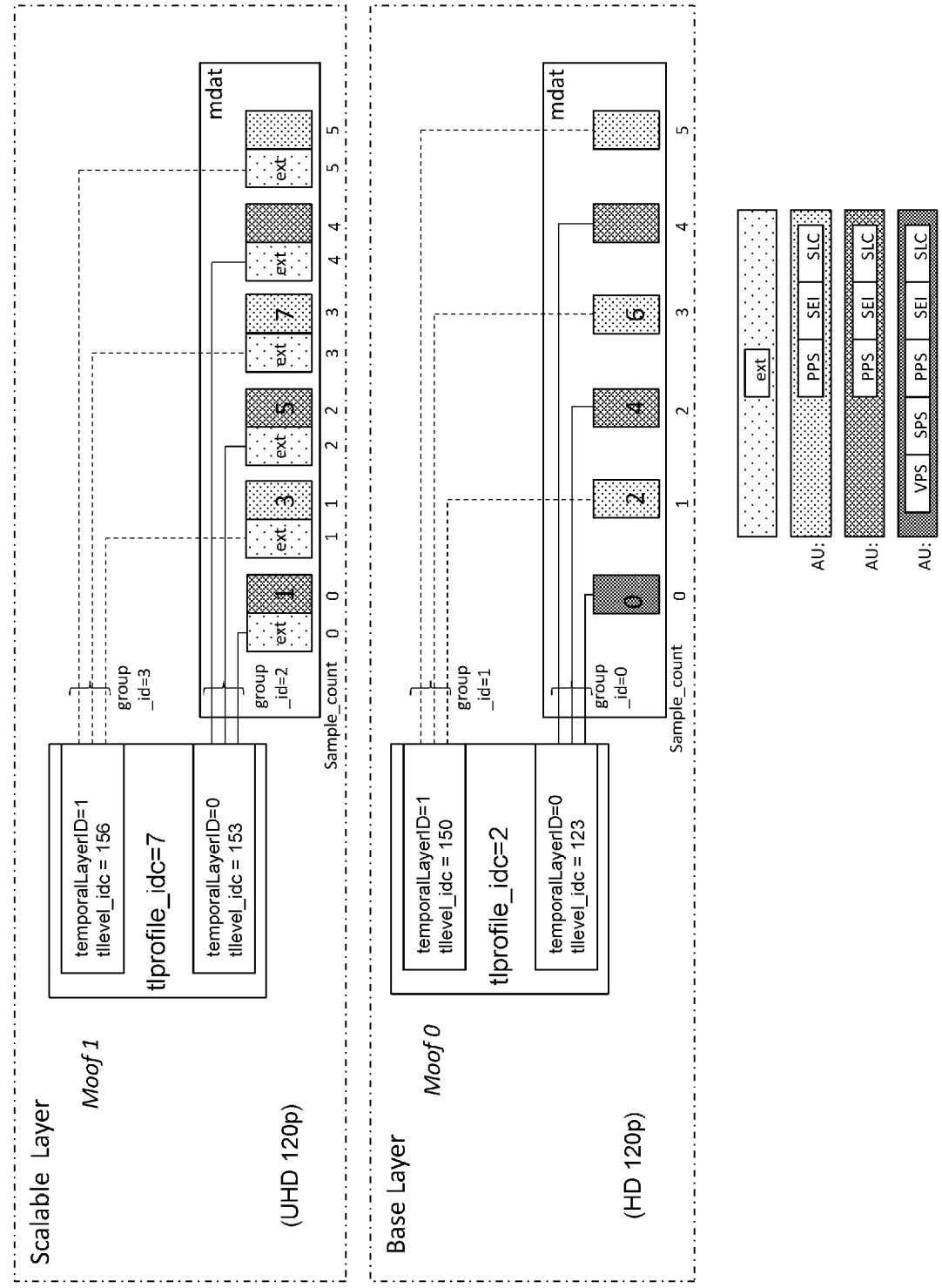
FIG. 7 is a diagram illustrating an example configuration of an MP4 stream (file) in transmission of Case 1.

FIG. 7 illustrates an example configuration of an MP4 stream (file) in Case 1. In the illustrated example, illustration is omitted of the initialization segment (IS) and the boxes of "styp", "sidx", and "ssix" enclosed by broken line frames in FIG. 4. The illustrated example is an example of Fragmented MP4. In the MP4 stream, a predetermined number of Movie Fragments is arranged each including a "moof" box including control information and a "mdat" box including the body of the media data. The "mdat" box includes fragments obtained by fragmentation of track data, so that the control information included in the "moof" box is control information associated with the fragments.

In the MP4 stream including the first video stream including the encoded image data of the first and second image data of the Base Layer, in the "mdat" box, the encoded image data (access unit) of the first and second image data are arranged for a predetermined number of pictures, for example, for one GOP. In this case, the Access Unit (AU) of the first image data and the Access Unit of the second image data are arranged alternately. Note that, the position of each access unit is indicated by information in the "SIDX" box or "SSIX" box. Each access unit includes NAL units such as "VPS", "SPS", "PPS", "SEI", and "SLC". Note that, "VPS" and "SPS" are inserted into, for example, the access unit at the head of the GOP.

FIG. 8 illustrates examples of SPS (VPS) elements. The example is an example in a case where the first to fourth image data are configured as illustrated in FIG. 6. The value of "general_level_idc" is set to "156", and it is indicated that the overall level of the encoded image data of the first to fourth image data (the complexity difference of the pixel rate of the scalable encoding) is "level 5.2". In addition, the value of "general_profile_idc" is set to "7", and it is indicated that the overall profile (scalable encoding type) of the encoded image data of the first to fourth image data is "Scalable Main 10 Profile".

In addition, "sublayer_level_present_flag[j−1]" is set to "1", the value of "sublayer_level_idc[j−1]" is set to "153", and "sublayer_profile_idc[j−1]" is set to "7". As a result, it is indicated that the overall level of the encoded image data of the third and first image data is "level 5.1", and its profile is "Scalable Main 10 Profile".

In addition, "sublayer_level_present_flag[j−2]" is set to "1", the value of "sublayer_level_idc[j−2]" is set to "150", and "sublayer_profile_idc[j−2]" is set to "2". As a result, it is indicated that the overall level of the encoded image data of the second and first image data is "level 5", and its profile is "Main 10 Profile".

In addition, "sublayer_level_present_flag[j−3]" is set to "1", the value of "sublayer_level_idc[j−3]" is set to "123", and "sublayer_profile_idc[j−3]" is set to "2". As a result, it is indicated that the level of the encoded image data of the first image data is "level 4.1", and its profile is "Main 10 Profile".

Referring back to FIG. 7, in the MP4 stream including the first video stream including the encoded image data of the first and second image data of the Base Layer, the first video stream is managed with one track, and there is one "moof" box (moof 0) corresponding to the "mdat" block. In the "moof (moof 0)" box, there are control information for management of the encoded image data of the first image data in the "mdat" block, and control information for management of the encoded image data of the second image data in the "mdat" block. These two pieces of control information are grouped by the group ID (group_id) in the "mdat" block and managed.

Although details in the "moof (moof 0)" box will be described later, in the "moof (moof 0)" box, there is a "tscl" box corresponding to the encoded image data of the first image data in the "mdat" block. In the "tscl" box, there is a description of "temporalLayerId=0", for example, and it is indicated that the first image data corresponds to a picture (sample) included in the base 60P. In addition, in the "tscl" box, there is a description of "tllevel_idc=123", and it is indicated that the level of the encoded image data of the first image data is "level 4.1". In addition, in the "tscl" box, there is a description of "Tlprofile_idc=2", and it is indicated that the profile of the encoded image data of the first image data is "Main 10 Profile".

In addition, in the "moof (moof 0)" box, there is a "tscl" box corresponding to the encoded image data of the second image data in the "mdat" block. In the "tscl" box, there is a description of "temporalLayerId=1", for example, and it is indicated that the second image data corresponds to a picture (sample) included in the enhancement 60P. In addition, in the "tscl" box, there is a description of "tllevel_idc=150", and it is indicated that the overall level of the encoded image data of the second and first image data is "level 5". In addition, in the "tscl" box, there is a description of "Tlprofile_idc=2", and it is indicated that the overall profile of the encoded image data of the second and first image data is "Main 10 Profile".

On the other hand, in the MP4 stream including the second video stream including the encoded image data of the third and fourth image data of the Scalable Layer, in the "mdat" box, the encoded image data (access unit) of the third and fourth image data are arranged for a predetermined number of pictures, for example, for one GOP. In this case, the Access Unit (AU) of the third image data and the Access Unit of the fourth image data are arranged alternately. Note that, the position of each access unit is indicated by information in the "SIDX" box or "SSIX" box. Each access unit includes NAL units such as "PPS", "SEI", and "SLC".

Note that, for reference from the Scalable Layer to the Base Layer, an extractor NAL unit is arranged just before all the access units. In the illustrated example, a numerical value illustrated in a rectangular frame indicating each access unit indicates the decoding order. This also applies to a similar figure below. For example, in a case where the access unit of "1" is decoded, it is necessary to refer to the access unit of "0", and in this case, a decoding result of the access unit of "0" is copied to the extractor arranged just before the access unit of "1" and used.

Within the layer, a decoding time stamp is given so that the decoding order of 120P in the Base Layer becomes 0→2→4→6→ . . . . With this decoding time stamp, the decoding order of 60P becomes 0→4→ . . . . That is, the base 60P and enhancement 60P are set so that the time stamp values are alternated in both the display order and the decoding order.

In addition, in the MP4 stream including the second video stream including the encoded image data of the third and fourth image data of the Scalable Layer, the second video stream is managed with one track, and there is one "moof" box (moof 1) corresponding to the "mdat" block. In the "moof (moof 1)" box, there are control information for management of the encoded image data of the third image data in the "mdat" block, and control information for management of the encoded image data of the fourth image data in the "mdat" block. These two pieces of control information are grouped by the group ID (group_id) in the "mdat" block and managed.

Although details in the "moof (moof 1)" box will be described later, in the "moof (moof 1)" box, there is a "tscl" box corresponding to the encoded image data of the third image data in the "mdat" block. In the "tscl" box, there is a description of "temporalLayerId=0", for example, and it is indicated that the third image data corresponds to a picture (sample) included in the base 60P. In addition, in the "tscl" box, there is a description of "tllevel_idc=153", and it is indicated that the overall level of the encoded image data of the third and first image data is "level 5.1". In addition, in the "tscl" box, there is a description of "Tlprofile_idc=7", and it is indicated that the overall profile of the encoded image data of the third and first image data is "Scalable Main 10 Profile".

In addition, in the "moof (moof 1)" box, there is a "tscl" box corresponding to the encoded image data of the fourth image data in the "mdat" block. In the "tscl" box, there is a description of "temporalLayerId=1", for example, and it is indicated that the fourth image data corresponds to a picture (sample) included in the enhancement 60P. In addition, in the "tscl" box, there is a description of "tllevel_idc=156", and it is indicated that the overall level of the encoded image data of the first to fourth image data is "level 5.2". In addition, in the "tscl" box, there is a description of "Tlprofile_idc=7", and it is indicated that the overall profile of the encoded image data of the first to fourth image data is "Scalable Main 10 Profile".

Note that, in the example of FIG. 7, the transmission order of each sample (picture) is set in the order of 0→1→2→3→4→5→ . . . . With this setting, it is possible to minimize the delay from reception to display.

FIG. 9 schematically illustrates an example of control information in the "moof (moof 0)" box. Note that, in the MP4 stream, how the layer with scalability is mapped is indicated by the "leva (level assignement)" box of the initialization segment (IS) existing in correspondence with the "moof (moof 0)" box. Here, the loop is repeated by the number of times of the level, and "Track_id", "assignment_type", and "grouping_type" are specified for each loop. In the "leva" box, there is a description of "level_count=2", and it is indicated that there are two levels "level0, level1" in one track "TR0".

The method of defining the group ID is as follows. To define a group within a track, there are first and second methods below. In the first method, "grouping_type" is defined as "temporal_layer_group" for each level, and group identification is performed inside the "moof" block. This mode can be set with "assignment_type=0". In the second method, "sub_track_id" is defined within a track for each level, and its value is made to coincide with "group_id" in the "moof" block. This mode can be set with "assignment_type=4".

In addition, to define a group between tracks, there is a third method below. It is a method of identifying a relationship between tracks by performing group identification by another track identification (track_id), and defining "grouping_type" as "temporal_layer_group". This mode can be set with "assignment_type=2".

In the illustrated example, in the "leva" box, there is a description of "level_count=2", and it is indicated that there are two levels "level0, level1" in one track "TR0". In the first method, in the "leva" box, "assignment_type=0" is described to indicate that it is the first method, and further, "grouping_type=1" is described corresponding to each of the two levels to indicate that the grouping type of each level is a temporal layer group.

On the other hand, in the second method, in the "leva" box, "assignment_type=4" is described to indicate that it is the second method, and further, "sub_track_id=0" and "sub_track_id=1" are described corresponding to each of the two levels, and "sub_track_id" is defined for each level. Note that, the value of "sub_track_id" can also be assigned to "group_id".

There is a "traf" box in the "moof (moof 0)" box, and there is a "tfhd" box in the box. There is a description of a track ID "track_id" in the "tfhd" box, and it is indicated that the track is "TR0". In addition, there is the "traf" box in the "moof (moof 0)" box, and there is a "tfdt" box in the box. In the "tfdt" box, there is a description of decoding time "baseMediaDecodeTime" of the first access unit after the "moof (moof 0)" box.

In addition, there is the "traf" box in the "moof (moof 0)" box, and there is a "trun" box in the box. In the "trun" box, there are descriptions of parameters of "sample_count" and "sample_composition_time_offset". With these parameters, values are set of time stamps indicating the decoding order and display order of the base 60P and enhancement 60P.

In addition, there is the "tfdt" box in the "moof (moof 0)" box, and there are two "sgpd" boxes in the box. In the first "sgpd" box, information is arranged associated with the first image data. In the "sgpd" box, there is a description of the parameter of "grouping_type". Here, "grouping_type=1" is set, and it is indicated that the grouping type is a temporal layer group.

In addition, there is a "scif" box under the "sgpd" box, and there is a description of the parameter of "group_id" in the "scif" box. Here, "group_id=0" is set, and it is indicated that the group ID is "0". In addition, "primary_groupID" is described together with "group_id". This also applies to each description part of "group_id" below. This is for identifying that the group in which the value of "group_id" coincides with the value of "primary_groupID" is a base 60P group. Here, since "group_id=0" is equal to the value of "primary_groupID", this group is identified as the base 60P group.

In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "0", it is indicated that the first image data corresponds to a picture (sample) included in the base 60P. By setting "tlConstantFrameRate" to "1", it is indicated that the frame rate is constant. "tllevel_idc" indicates the level of the encoded image data of the first image data, and is made to coincide with "sublayer_level_idc[j−3]" of the element of the SPS (or VPS) described above. Here, "tllevel_idc" is set to "123". "Tlprofile" indicates the profile of the encoded image data of the first image data, and is made to coincide with "sublayer_profile_idc[j−3]" of the element of the SPS (or VPS) described above. Here, "Tlprofile" is set to "2".

In the second "sgpd" box, information is arranged associated with the second image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. In this case, "group_id=1" is set, and it is indicated that the group ID is "1". In addition, "primary_groupID" is described together with "group_id". Here, since "group_id=1" does not coincide with the value of "primary_groupID", this group is not identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "1", it is indicated that the second image data corresponds to a picture (sample) included in the enhancement 60P. By setting "tlConstantFrameRate" to "1", it is indicated that the frame rate is constant. "tllevel_idc" indicates the overall level of the encoded image data of the second and first image data, and is made to coincide with "sublayer_level_idc[j−2]" of the element of the SPS (or VPS) described above. Here, "tllevel_idc" is set to "150". "Tlprofile" indicates the profile of the encoded image data of the second and first image data, and is made to coincide with "sublayer_profile_idc[j−2]" of the element of the SPS (or VPS) described above. Here, "Tlprofile" is set to "2".

FIG. 10 schematically illustrates an example of control information in the "moof (moof 1)" box. In the "leva" box, there is a description of "level_count=2", and it is indicated that there are two levels "level0, level1" in one track "TR0". In the first method, in the "leva" box, "assignment_type=0" is described to indicate that it is the first method, and further, "grouping_type=1" is described corresponding to each of the two levels to indicate that the grouping type of each level is a temporal layer group.

On the other hand, in the second method, in the "leva" box, "assignment_type=4" is described to indicate that it is the second method, and further, "sub_track_id=2" and "sub_track_id=3" are described corresponding to each of the two levels, and "sub_track_id" is defined for each level. Note that, the value of "sub_track_id" can also be assigned to "group_id".

There is a "traf" box in the "moof (moof 1)" box, and there is a "tfhd" box in the box. There is a description of a track ID "track_id" in the "tfhd" box, and it is indicated that the track is "TR1". In addition, there is the "traf" box in the "moof (moof 1)" box, and there is a "tfdt" box in the box. In the "tfdt" box, there is a description of decoding time "baseMediaDecodeTime" of the first access unit after the "moof (moof 1)" box. The decoding time "baseMediaDecodeTime" is set to the same value as of the decoding time "baseMediaDecodeTime" of the track TR0 pointed by the extractor.

In addition, there is the "traf" box in the "moof (moof 1)" box, and there is a "trun" box in the box. In the "trun" box, there are descriptions of parameters of "sample_count" and "sample_composition_time_offset". With these parameters, values are set of time stamps indicating the display order and decoding order of the base 60P and enhancement 60P.

In addition, there is the "tfdt" box in the "moof (moof 1)" box, and there are two consecutive "sgpd" boxes in the box. In the first "sgpd" box, information is arranged associated with the first image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. Here, "group_id=2" is set, and it is indicated that the group ID is "2". In addition, "primary_groupID" is described together with "group_id". Here, since "group_id=2 does not coincide with the value of "primary_groupID", this group is not identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "0", it is indicated that the third image data corresponds to a picture (sample) included in the base 60P. By setting "tlConstantFrameRate" to "1", it is indicated that the frame rate is constant. "tllevel_idc" indicates the overall level of the encoded image data of the third and first image data, and is made to coincide with "sublayer_level_idc[j−1]" of the element of the SPS (or VPS) described above. Here, "tllevel_idc" is set to "153". "Tlprofile" indicates the overall profile of the encoded image data of the third and first image data, and is made to coincide with "sublayer_profile_idc[j−1]" of the element of the SPS (or VPS) described above. Here, "Tlprofile" is set to "7".

In the next "sgpd" box, information is arranged associated with the fourth image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. Here, "group_id=3" is set, and it is indicated that the group ID is "3". In addition, "primary_groupID" is described together with "group_id". Here, since "group_id=3" does not coincide with the value of "primary_groupID", this group is not identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "1", it is indicated that the fourth image data corresponds to a picture (sample) included in the enhancement 60P. By setting "tlConstantFrameRate" to "1", it is indicated that the frame rate is constant. "tllevel_idc" indicates the overall level of the encoded image data of the fourth to first image data, and is made to coincide with the "general_level_idc" of the element of the SPS (or VPS) described above. Here, "tllevel_idc" is set to "156". "Tlprofile" indicates the profile of the entire encoded image data of the encoded image data of the fourth to first image data, and is made to coincide with the "general_profile_idc]" of the element of the SPS (or VPS) described above. Here, "Tlprofile" is set to "7".

Figure 11:
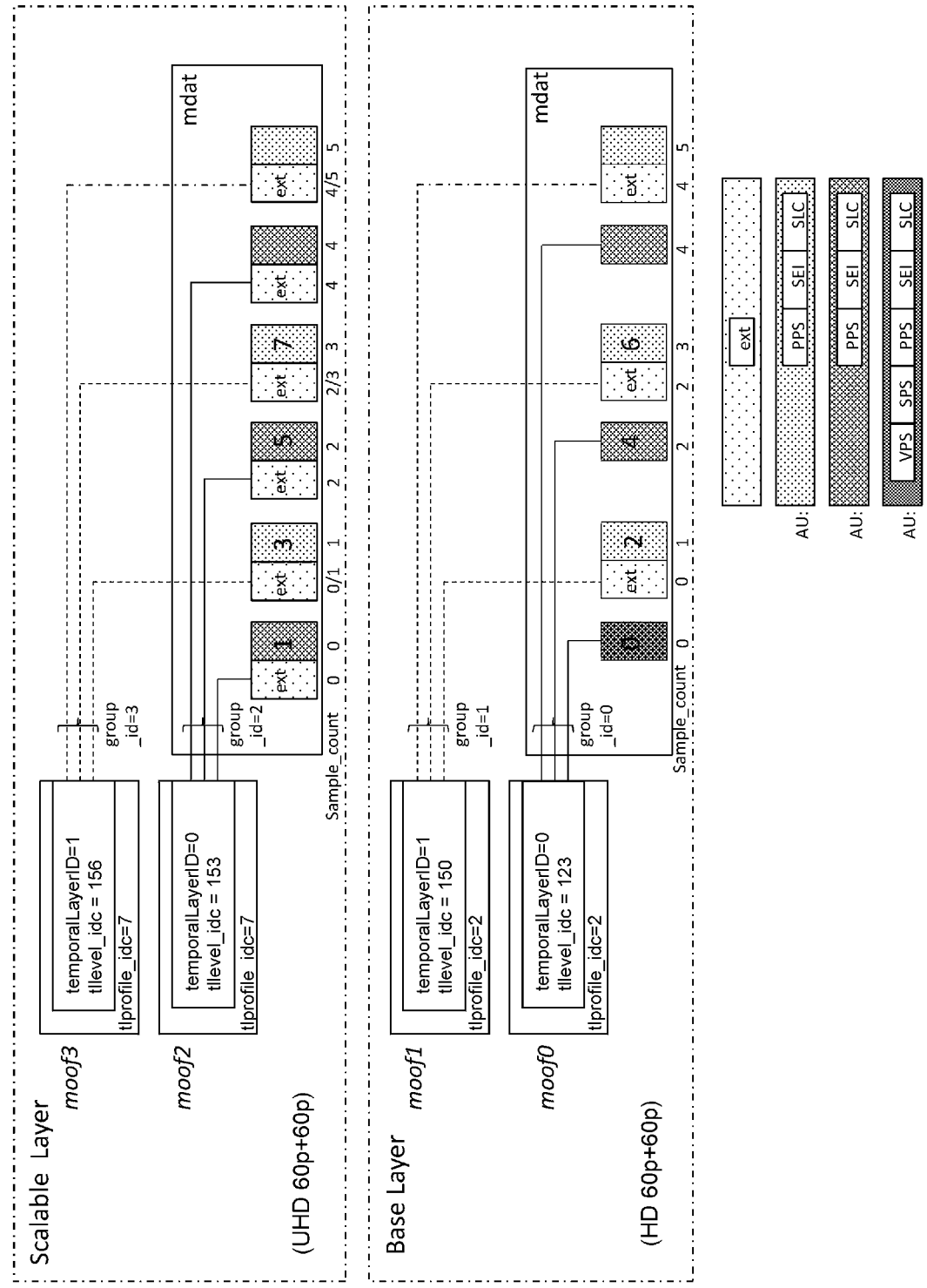
FIG. 11 is a diagram illustrating an example configuration of an MP4 stream (file) in transmission of Case 2.

FIG. 11 illustrates an example configuration of an MP4 stream (file) in Case 2. In the illustrated example, illustration is omitted of the initialization segment (IS) and the boxes of "styp", "sidx", and "ssix" enclosed by broken line frames in FIG. 4. The illustrated example is an example of Fragmented MP4. In the MP4 stream, a predetermined number of Movie Fragments is arranged each including a "moof" box including control information and a "mdat" box including the body of the media data. The "mdat" box includes fragments obtained by fragmentation of track data, so that the control information included in the "moof" box is control information associated with the fragments.

In the MP4 stream including the first video stream including the encoded image data of the first and second image data of the Base Layer, in the "mdat" box, the encoded image data (access unit) of the first and second image data are arranged for a predetermined number of pictures, for example, for one GOP. In this case, the Access Unit (AU) of the first image data and the Access Unit of the second image data are arranged alternately. Note that, the position of each access unit is indicated by information in the "SIDX" box or "SSIX" box. Each access unit includes NAL units such as "VPS", "SPS", "PPS", "SEI", and "SLC". Note that, "VPS" and "SPS" are inserted into, for example, the access unit at the head of the GOP.

Note that, for reference from the access unit of the second image data to the access unit of the first image data of another track, an extractor NAL unit is arranged just before the access unit of the second image data. For example, in a case where the access unit of "2" is decoded, it is necessary to refer to the access unit of "0", and in this case, a decoding result of the access unit of "0" is copied to the extractor arranged just before the access unit of "2" and used.

In the MP4 stream including the first video stream including the encoded image data of the first and second image data of the Base Layer, the first video stream is managed with two tracks, and there are two "moof" boxes (moof 0, moof 1) corresponding to the "mdat" block. In the "moof (moof 0)" box, there is control information for management of the encoded image data of the first image data in the "mdat" block.

Although details in the "moof (moof 0)" box will be described later, there is a "tscl" box in the "moof (moof 0)" box. In the "tscl" box, there is a description of "temporalLayerId=0", for example, and it is indicated that the first image data corresponds to a picture (sample) included in the base 60P. In addition, in the "tscl" box, there is a description of "tllevel_idc=123", and it is indicated that the level of the encoded image data of the first image data is "level 4.1". In addition, in the "tscl" box, there is a description of "Tlprofile_idc=2", and it is indicated that the profile of the encoded image data of the first image data is "Main 10 Profile".

In addition, although details in the "moof (moof 1)" box will be described later, there is a "tscl" box in the "moof (moof 1)" box. In the "tscl" box, there is a description of "temporalLayerId=1", for example, and it is indicated that the second image data corresponds to a picture (sample) included in the enhancement 60P. In addition, in the "tscl" box, there is a description of "tllevel_idc=150", and it is indicated that the overall level of the encoded image data of the second and first image data is "level 5". In addition, in the "tscl" box, there is a description of "Tlprofile_idc=2", and it is indicated that the overall profile of the encoded image data of the second and first image data is "Main 10 Profile".

On the other hand, in the MP4 stream including the second video stream including the encoded image data of the third and fourth image data of the Scalable Layer, in the "mdat" box, the encoded image data (access unit) of the third and fourth image data are arranged for a predetermined number of pictures, for example, for one GOP. In this case, the Access Unit (AU) of the third image data and the Access Unit of the fourth image data are arranged alternately. Note that, the position of each access unit is indicated by information in the "SIDX" box or "SSIX" box. Each access unit includes NAL units such as "PPS", "SEI", and "SLC".

Note that, for reference from the Scalable Layer to the Base Layer and additionally for reference from the access unit of the fourth image data to the access unit of the third image data of another track, an extractor NAL unit is arranged just before all the access units. For example, in a case where the access unit of "1" is decoded, it is necessary to refer to the access unit of "0", and in this case, a decoding result of the access unit of "0" is copied to the extractor arranged just before the access unit of "1" and used.

Within the layer, a decoding time stamp is given so that the decoding order of 120P in the Base Layer becomes 0→2→4→6→ . . . . With this decoding time stamp, the decoding order of 60P becomes 0→4→ . . . . That is, the base 60P and enhancement 60P are set so that the time stamp values are alternated in both the display order and the decoding order.

In addition, in the MP4 stream including the second video stream including the encoded image data of the third and fourth image data of the Scalable Layer, the second video stream is managed with two tracks, and there are two "moof" boxes (moof 2, moof 3) corresponding to the "mdat" block. In the "moof (moof 2)" box, there is control information for management of the encoded image data of the third image data in the "mdat" block.

Although details in the "moof (moof 2)" box will be described later, there is a "tscl" box in the "moof (moof 2)" box. In the "tscl" box, there is a description of "temporalLayerId=0", for example, and it is indicated that the third image data corresponds to a picture (sample) included in the base 60P. In addition, in the "tscl" box, there is a description of "tllevel_idc=153", and it is indicated that the overall level of the encoded image data of the third and first image data is "level 5.1". In addition, in the "tscl" box, there is a description of "Tlprofile_idc=7", and it is indicated that the overall profile of the encoded image data of the third and first image data is "Scalable Main 10 Profile".

In addition, although details in the "moof (moof 3)" box will be described later, there is a "tscl" box in the "moof (moof 3)" box. In the "tscl" box, there is a description of "temporalLayerId=1", for example, and it is indicated that the fourth image data corresponds to a picture (sample) included in the enhancement 60P. In addition, in the "tscl" box, there is a description of "tllevel_idc=156", and it is indicated that the overall level of the encoded image data of the fourth to first image data is "level 5.2". In addition, in the "tscl" box, there is a description of "Tlprofile_idc=7", and it is indicated that the overall profile of the encoded image data of the fourth to first image data is "Scalable Main 10 Profile".

Note that, in the example of FIG. 11, the transmission order of each sample (picture) is set in the order of 0→1→2→3→4→5→ . . . . With this setting, it is possible to minimize the delay from reception to display.

FIG. 12 schematically illustrates an example of control information in the "moof (moof 0)" box and the "moof (moof 1)" box. Note that, in the MP4 stream, how the layer with scalability is mapped is indicated by the "leva (level assignement)" box of the initialization segment (IS) existing in correspondence with these "moof" boxes. Here, the loop is repeated by the number of times of the level, and "Track_id", "grouping_type", and "assignment_type" are specified for each loop.

In the illustrated example, in the "leva" box, there is a description of "level_count=2", and it is indicated that there is one level in each of the two tracks "TR0" and "TR1". In addition, in the "leva" box, "assignment_type=2" is described corresponding to the level of the two tracks to indicate that it is the third method, and further, "grouping_type=1" is described corresponding to the level of the two tracks, and it is indicated that the grouping type of each level is a temporal layer group.

There is a "traf" box in the "moof (moof 0)" box, and there is a "tfhd" box in the box. There is a description of a track ID "track_id" in the "tfhd" box, and it is indicated that the track is "TR0". In addition, there is the "traf" box in the "moof (moof 0)" box, and there is a "tfdt" box in the box. In the "tfdt" box, there is a description of decoding time "baseMediaDecodeTime" of the first access unit after the "moof (moof 0)" box.

In addition, there is the "traf" box in the "moof (moof 1)" box, and there is a "trun" box in the box. In the "trun" box, there are descriptions of parameters of "sample_count" and "sample_composition_time_offset". With these parameters, values are set of time stamps indicating the display order and decoding order of the base 60P.

In addition, there is the "tfdt" box in the "moof (moof 0)" box, and there is a "sgpd" box in the box. In the "sgpd" box, information is arranged associated with the first image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. Here, "group_id=0" is set, and it is indicated that the group ID is "0". In addition, "primary_groupID" is described together with "group_id". Here, since "group_id=0" is equal to the value of "primary_groupID", this group is identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "0", it is indicated that the first image data corresponds to a picture (sample) included in the base 60P. By setting "tlConstantFrameRate" to "1", it is indicated that the frame rate is constant. "tllevel_idc" indicates the level of the encoded image data of the first image data, and is made to coincide with "sublayer_level_idc[j−3]" of the element of the SPS (or VPS) described above. Here, "tllevel_idc" is set to "123". "Tlprofile" indicates the profile of the encoded image data of the first image data, and is made to coincide with "sublayer_ profile_idc[j−3]" of the element of the SPS (or VPS) described above. Here, "Tlprofile" is set to "2".

On the other hand, there is a "traf" box in the "moof (moof 1)" box, and there is a "tfhd" box in the box. There is a description of a track ID "track_id" in the "tfhd" box, and it is indicated that the track is "TR1". In addition, there is the "traf" box in the "moof (moof 1)" box, and there is a "tfdt" box in the box. In the "tfdt" box, there is a description of decoding time "baseMediaDecodeTime" of the first access unit after the "moof (moof 1)" box. The decoding time "baseMediaDecodeTime" is set to the same value as of the decoding time "baseMediaDecodeTime" of the track TR0 pointed by the extractor.

In addition, there is the "traf" box in the "moof (moof 1)" box, and there is a "trun" box in the box. In the "trun" box, there are descriptions of parameters of "sample_count" and "sample_composition_time_offset". With these parameters, values are set of time stamps indicating the display order and decoding order of the enhancement 60P.

In addition, there is the "tfdt" box in the "moof (moof 1)" box, and there is a "sgpd" box in the box. In the "sgpd" box, information is arranged associated with the second image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. In this case, "group_id=1" is set, and it is indicated that the group ID is "1". In addition, "primary_groupID" is described together with "group_id". Here, since "group_id=1" does not coincide with the value of "primary_groupID", this group is not identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "1", it is indicated that the second image data corresponds to a picture (sample) included in the enhancement 60P. By setting "tlConstantFrameRate" to "1", it is indicated that the frame rate is constant. "tllevel_idc" indicates the overall level of the encoded image data of the second and first image data, and is made to coincide with "sublayer_level_idc[j−2]" of the element of the SPS (or VPS) described above. Here, "tllevel_idc" is set to "150". "Tlprofile" indicates the overall profile of the encoded image data of the second and first image data, and is made to coincide with "sublayer_profile_idc[j−2]" of the element of the SPS (or VPS) described above. Here, "Tlprofile" is set to "2".

FIG. 13 schematically illustrates an example of control information in the "moof (moof 2)" box and the "moof (moof 3)" box. In the illustrated example, in the "leva" box, there is a description of "level_count=2", and it is indicated that there is one level in each of the two tracks "TR2" and "TR3". In addition, in the "leva" box, "assignment_type=2" is described corresponding to the level of the two tracks to indicate that it is the third method, and further, "grouping_type=1" is described corresponding to the level of the two tracks, and it is indicated that the grouping type of each level is a temporal layer group.

There is a "traf" box in the "moof (moof 2)" box, and there is a "tfhd" box in the box. There is a description of a track ID "track_id" in the "tfhd" box, and it is indicated that the track is "TR2". In addition, there is the "traf" box in the "moof (moof 2)" box, and there is a "tfdt" box in the box. In the "tfdt" box, there is a description of decoding time "baseMediaDecodeTime" of the first access unit after the "moof (moof 2)" box. The decoding time "baseMediaDecodeTime" is set to the same value as of the decoding time "baseMediaDecodeTime" of the track TR0 pointed by the extractor.

In addition, there is the "traf" box in the "moof (moof 2)" box, and there is a "trun" box in the box. In the "trun" box, there are descriptions of parameters of "sample_count" and "sample_composition_time_offset". With these parameters, values are set of time stamps indicating the display order and decoding order of the base 60P.

In addition, there is the "tfdt" box in the "moof (moof 2)" box, and there is a "sgpd" box in the box. In the "sgpd" box, information is arranged associated with the third image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. Here, "group_id=2" is set, and it is indicated that the group ID is "2". In addition, "primary_groupID" is described together with "group_id". Here, since "group_id=2" does not coincide with the value of "primary_groupID", this group is not identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "0", it is indicated that the third image data corresponds to a picture (sample) included in the base 60P. By setting "tlConstantFrameRate" to "1", it is indicated that the frame rate is constant. "tllevel_idc" indicates the overall level of the encoded image data of the third and first image data, and is made to coincide with "sublayer_level_idc[j−1]" of the element of the SPS (or VPS) described above. Here, "tllevel_idc" is set to "153". "Tlprofile" indicates the overall profile of the encoded image data of the third and first image data, and is made to coincide with "sublayer_profile_idc[j−1]" of the element of the SPS (or VPS) described above. Here, "Tlprofile" is set to "7".

On the other hand, there is a "traf" box in the "moof (moof 3)" box, and there is a "tfhd" box in the box. There is a description of a track ID "track_id" in the "tfhd" box, and it is indicated that the track is "TR3". In addition, there is the "traf" box in the "moof (moof 3)" box, and there is a "tfdt" box in the box. In the "tfdt" box, there is a description of the decoding time "baseMediaDecodeTime" of the first access unit after the "moof (moof 3)" box. The decoding time "baseMediaDecodeTime" is set to the same value as of the decoding time "baseMediaDecodeTime" of the track TR2 pointed by the extractor, and hence is set to the same value as of the decoding time "baseMediaDecodeTime" of the track TR0.

In addition, there is the "traf" box in the "moof (moof 1)" box, and there is a "trun" box in the box. In the "trun" box, there are descriptions of parameters of "sample_count" and "sample_composition_time_offset". With these parameters, values are set of time stamps indicating the display order and decoding order of the enhancement 60P.

In addition, there is the "tfdt" box in the "moof (moof 3)" box, and there is a "sgpd" box in the box. In the "sgpd" box, information is arranged associated with the fourth image data. In the "sgpd" box, there is a description of the parameter of "grouping_type". Here, "grouping_type=1" is set, and it is indicated that the grouping type is a temporal layer group.

In addition, there is a "scif" box in the "sgpd" box, and there is a description of the parameter of "group_id" in the "scif" box. Here, "group_id=3" is set, and it is indicated that the group ID is "3". In addition, "primary_groupID" is described together with "group_id". Here, since "group_id=3" does not coincide with the value of "primary_groupID", this group is not identified as the base 60P group. In addition, there is a "tscl" box in the "sgpd" box. In the "tscl" box, there are descriptions of four parameters of "temporalLayerId", "tllevel_idc", "Tlprofile", and "tlConstantFrameRate".

By setting "temporalLayerId" to "1", it is indicated that the fourth image data corresponds to a picture (sample) included in the enhancement 60P. By setting "tlConstantFrameRate" to "1", it is indicated that the frame rate is constant. "tllevel_idc" indicates the overall level of the encoded image data of the fourth to first image data, and is made to coincide with "general_level_idc" of the element of the SPS (or VPS) described above. Here, "tllevel_idc" is set to "156". "Tlprofile" indicates the overall profile of the encoded image data of the fourth to first image data, and is made to coincide with "general_profile_idc]" of the element of the SPS (or VPS) described above. Here, "Tlprofile" is set to "7".

Figure 14:
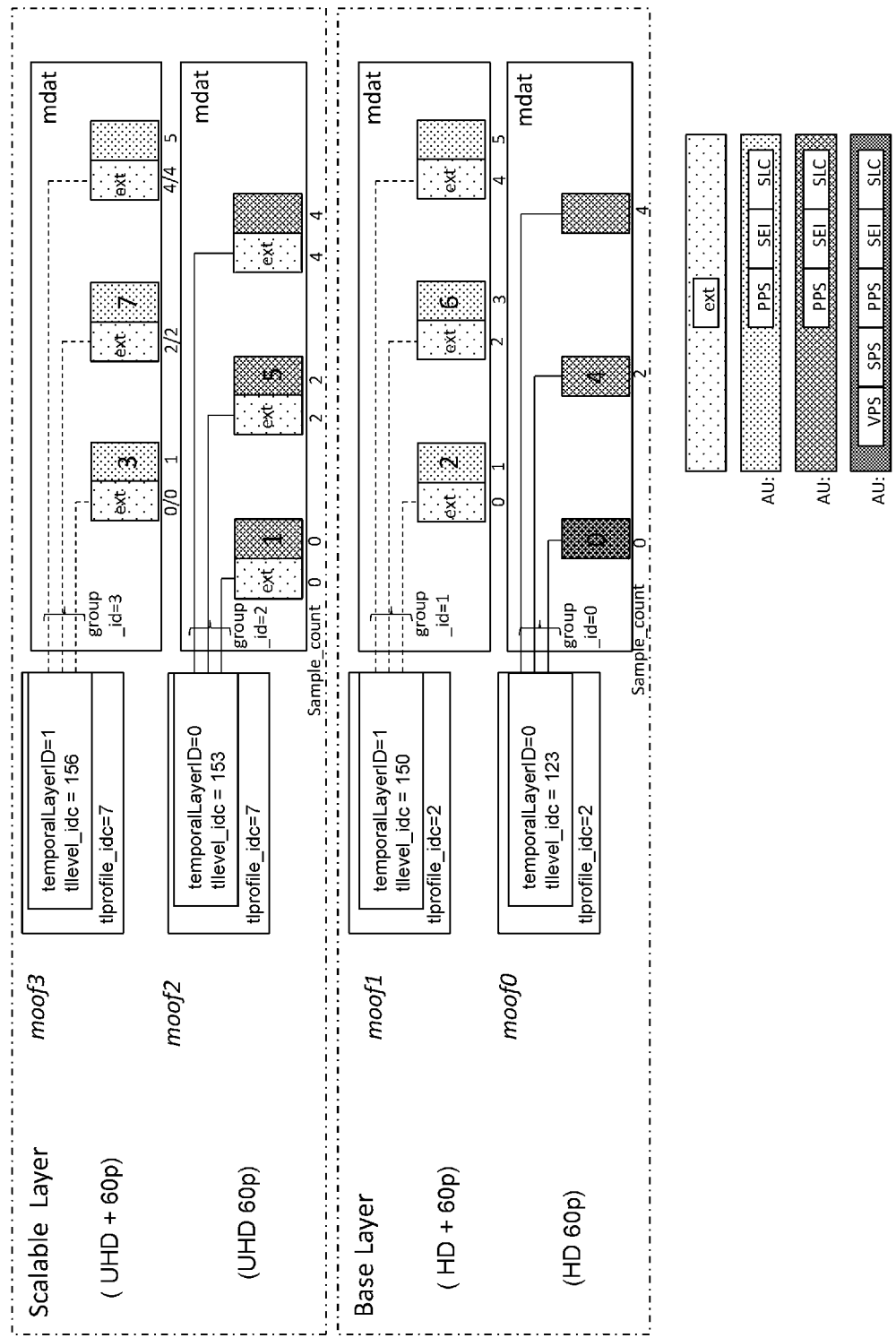
FIG. 14 is a diagram illustrating an example configuration of an MP4 stream (file) in transmission of Case 3.

FIG. 14 illustrates an example configuration of an MP4 stream (file) in Case 3. In the illustrated example, illustration is omitted of the initialization segment (IS) and the boxes of "styp", "sidx", and "ssix" enclosed by broken line frames in FIG. 4. The illustrated example is an example of Fragmented MP4. In the MP4 stream, a predetermined number of Movie Fragments is arranged each including a "moof" box including control information and a "mdat" box including the body of the media data. The "mdat" box includes fragments obtained by fragmentation of track data, so that the control information included in the "moof" box is control information associated with the fragments.

In the MP4 stream including the first video stream including the encoded image data of the first image data of the Base Layer, in the "mdat" box, the encoded image data (access unit) of the first image data is arranged for a predetermined number of pictures, for example, for one GOP. Note that, the position of each access unit is indicated by information in the "SIDX" box or "SSIX" box. Each access unit includes NAL units such as "VPS", "SPS", "PPS", "SEI", and "SLC". Note that, "VPS" and "SPS" are inserted into, for example, the access unit at the head of the GOP.

In the MP4 stream including the first video stream, the first video stream is managed with one track, and there is one "moof" box (moof 0) corresponding to the "mdat" block. In the "moof (moof 0)" box, there is control information for management of the encoded image data of the first image data in the "mdat" block.

Details in the "moof (moof 0)" box are similar to those of the case of Case 2 described above, so that description thereof is omitted; however, there is a "tscl" box in the "moof (moof 0)" box. In the "tscl" box, there is a description of "temporalLayerId=0", for example, and it is indicated that the first image data corresponds to a picture (sample) included in the base 60P. In addition, in the "tscl" box, there is a description of "tllevel_idc=123", and it is indicated that the level of the encoded image data of the first image data is "level 4.1". In addition, in the "tscl" box, there is a description of "Tlprofile_idc=2", and it is indicated that the profile of the encoded image data of the first image data is "Main 10 Profile".

In addition, in the MP4 stream including the second video stream including the encoded image data of the second image data of the Base Layer, in the "mdat" box, the encoded image data (access unit) of the second image data is arranged for a predetermined number of pictures, for example, for one GOP. Note that, the position of each access unit is indicated by information in the "SIDX" box or "SSIX" box. Each access unit includes NAL units such as "PPS", "SEI", and "SLC".

Note that, for reference from the access unit of the second image data to the access unit of the first image data of another track, an extractor NAL unit is arranged just before all the access units. For example, in a case where the access unit of "2" is decoded, it is necessary to refer to the access unit of "0", and in this case, a decoding result of the access unit of "0" is copied to the extractor arranged just before the access unit of "2" and used.

In the MP4 stream including the second video stream, the second video stream is managed with one track, and there is one "moof" box (moof 1) corresponding to the "mdat" block. In the "moof (moof 1)" box, there is control information for management of the encoded image data of the second image data in the "mdat" block.

Details in the "moof (moof 1)" box are similar to those of the case of Case 2 described above, so that description thereof is omitted; however, there is a "tscl" box in the "moof (moof 1)" box. In the "tscl" box, there is a description of "temporalLayerId=1", for example, and it is indicated that the first image data corresponds to a picture (sample) included in the enhancement 60P. In addition, in the "tscl" box, there is a description of "tllevel_idc=150", and it is indicated that the overall level of the encoded image data of the second and first image data is "level 5". In addition, in the "tscl" box, there is a description of "Tlprofile_idc=2", and it is indicated that the overall profile of the encoded image data of the second and first image data is "Main 10 Profile".

Within the layer, a decoding time stamp is given so that the decoding order of 120P in the Base Layer becomes 0→2→4→6→ . . . . With this decoding time stamp, the decoding order of 60P becomes 0→4→ . . . . That is, the base 60P and enhancement 60P are set so that the time stamp values are alternated in both the display order and the decoding order.

In addition, in the MP4 stream including the third video stream including the encoded image data of the third image data of the Scalable Layer, in the "mdat" box, the encoded image data (access unit) of the third image data is arranged for a predetermined number of pictures, for example, for one GOP. Note that, the position of each access unit is indicated by information in the "SIDX" box or "SSIX" box. Each access unit includes NAL units such as "PPS", "SEI", and "SLC".

Note that, for reference from the Scalable Layer to the Base Layer, an extractor NAL unit is arranged just before all the access units. For example, in a case where the access unit of "1" is decoded, it is necessary to refer to the access unit of "0", and in this case, a decoding result of the access unit of "0" is copied to the extractor arranged just before the access unit of "1" and used.

In the MP4 stream including the third video stream, the third video stream is managed with one track, and there is one "moof" box (moof 2) corresponding to the "mdat" block. In the "moof (moof 2)" box, there is control information for management of the encoded image data of the third image data in the "mdat" block.

Details in the "moof (moof 2)" box are similar to those of the case of Case 2 described above, so that description thereof is omitted; however, there is a "tscl" box in the "moof (moof 2)" box. In the "tscl" box, there is a description of "temporalLayerId=0", for example, and it is indicated that the third image data corresponds to a picture (sample) included in the base 60P. In addition, in the "tscl" box, there is a description of "tllevel_idc=153", and it is indicated that the overall level of the encoded image data of the third and first image data is "level 5.1". In addition, in the "tscl" box, there is a description of "Tlprofile_idc=7", and it is indicated that the overall profile of the encoded image data of the third and first image data is "Scalable Main 10 Profile".

In addition, in the MP4 stream including the fourth video stream including the encoded image data of the fourth image data of the Scalable Layer, in the "mdat" box, the encoded image data (access unit) of the fourth image data is arranged for a predetermined number of pictures, for example, for one GOP. Note that, the position of each access unit is indicated by information in the "SIDX" box or "SSIX" box. Each access unit includes NAL units such as "PPS", "SEI", and "SLC".

Note that, for reference from the Scalable Layer to the Base Layer and additionally for reference from the access unit of the fourth image data to the access unit of the third image data of another track, an extractor NAL unit is arranged just before all the access units. For example, in a case where the access unit of "3" is decoded, it is necessary to refer to the access units of "2" and "1", and in this case, decoding results of the access units of "2" and "1" are copied to the two extractors arranged just before the access units of "2" and "1" and used.

In the MP4 stream including the fourth video stream, the fourth video stream is managed with one track, and there is one "moof" box (moof 3) corresponding to the "mdat" block. In the "moof (moof 3)" box, there is control information for management of the encoded image data of the fourth image data in the "mdat" block.

Details in the "moof (moof 3)" box are similar to those of the case of Case 2 described above, so that description thereof is omitted; however, there is a "tscl" box in the "moof (moof 3)" box. In the "tscl" box, there is a description of "temporalLayerId=1", for example, and it is indicated that the fourth image data corresponds to a picture (sample) included in the enhancement 60P. In addition, in the "tscl" box, there is a description of "tllevel_idc=156", and it is indicated that the overall level of the encoded image data of the fourth to first image data is "level 5.2". In addition, in the "tscl" box, there is a description of "Tlprofile_idc=7", and it is indicated that the overall profile of the encoded image data of the fourth to first image data is "Scalable Main 10 Profile".

Note that, in the example of FIG. 14, the transmission order of each sample (picture) is set in the order of 0→1→2→3→4→5→ . . . . With this setting, it is possible to minimize the delay from reception to display.

Here, the parameters will be further described of "sample_ count" and "sample_composition_time_offset" for setting the value of the time stamp indicating the display order and decoding order of the base 60P and enhancement 60P. "baseMediaDecodeTime" in the "tfdt" box represents the decoding time stamp of the first sample (picture) of the fragment. The decoding time of each subsequent sample is described by "sample_count" in the "trun" box. In addition, the display time stamp of each sample is represented by "sample_composition_time_offset" indicating an offset from "sample_count".

In the Base Layer of FIG. 7, "sample_count" of "0" coincides with "baseMediaDecodeTime", and then "sample_count" of "2" and "4" are values sequentially increased one by one in units of 120 Hz, respectively. This indicates that the decoding time of the sample of "2" that is the sample of the enhancement 60P is sandwiched between the decoding times of the two samples of "0" and "4" that are samples of the base 60P.

In addition, in the Scalable Layer, the decoding time (="sample_count") of the extractor of "1" indicating inter-layer prediction is the same value as of the decoding time of the sample of "0". "sample_count" of "1" has the same value as the immediately preceding extractor and indicates that there is no time offset. The extractor of "3" is arranged in a case where "2" is referenced, and its "sample_count" has the same value as of "2". In a case where the referent of the sample of "3" is "1", the value increased by 1 to "sample_ count" of "1" is set to the value of "sample_count" of "3".

In this way, "sample_count" corresponding to the decoding time is given with an accuracy of 120 Hz. A receiver that decodes the base 60P of the Base Layer transfers only the sample belonging to the base 60P group, in every other one, to the decoder.

In both FIGS. 11 and 14, "sample_count" of the extractor of "2" within the Base Layer has the same value as of "sample_count" of "0". "sample_count" of "2" is a value increased by 1 to "sample_count" of the immediately preceding extractor. The value of "sample_count" of "4" is a value further increased by 1 to "sample_count" of "2". Subsequently, this is performed similarly. In this way, "sample_count" corresponding to the decoding time is given with an accuracy of 120 Hz.

In the Scalable Layer, the extractor of "1" represents inter-layer reference, its "sample_count" has the same value as of "0", and "sample_count" of "1" has the same value as of the immediately preceding extractor. In the extractor of "3", in a case where another track within the Scalable Layer is referenced, its "sample_count" is the same as of "1", and alternatively, in a case where the value of "2" of the Base Layer is referenced, its "sample_count" is the same as of "2". In either case, the value of "sample_count" of "3" has the same value as of "2".

The extractor of "5" represents inter-layer reference, and its "sample_count" has the same value as of "sample_count" of "4". "Sample_count" of "5" has the same value as of "4". As described above, also in the Scalable Layer, the decoding time of the sample of "3" that is the sample of the enhancement 60P is sandwiched between the decoding times of the two samples of "1" and "5" that are samples of the base 60P. A receiver that decodes 60P of the Scalable Layer transfers "sample_count" of the sample within the layer, in every other one, to the decoder, for only the sample belonging to the base 60P group.

FIG. 15 illustrates a description example of the MPD file in the case of transmission of a two-stream configuration (in the cases of Case 1 and Case 2). Here, for simplicity of description, an example is shown in which only the information associated with the video stream is described; however, information associated with other media streams of the video stream is also described, actually. FIG. 16 illustrates "Value" semantics of "SupplementaryDescriptor".

By the description of "<AdaptationSet mimeType="video/mp4" codecs="hev1.xx.xx.L150,xx, hev1.yy.yy.L156,yy"", it is indicated that there is an AdaptationSet for a video stream, the video stream is supplied in an MP4 file structure, and there are HEVC encoded image data of a level of 150, and a level of 156.

By the description of "<SupplementaryDescriptor schemeIdUri="urn:brdcst:video:highdynamicrange" value="HDR"/>", it is indicated that the current stream is an HDR stream. Note that, "1" may be described instead of "HDR" to indicate that it is an HDR stream. Note that, in the case of indicating that it is an SDR stream, "SDR" or "0" is described.

By the description of "<SupplementaryDescriptor schemeIdUri="urn:brdcst:video:transferfunction" value="TFtype"/>", the electro-optical and photoelectric conversion characteristics (TF characteristic) are indicated. For example, in the case of "BT.709-5 Transfer Function", "bt709" or "1" is described in the "TFtype" part. In addition, for example, in the case of "10 bit BT.2020 Transfer Function", "bt2020-10" or "14" is described in the "TFtype" part. In addition, for example, in the case of "SMPTE 2084 Transfer Function", "st2084" or "16" is described in the "TFtype" part. In addition, for example, in the case of "ARIB STD B-67 Transfer Function", "arib-b67" or "18" is described in the "TFtype" part.

By the description of "<SupplementaryDescriptor schemeIdUri="urn:brdcst:video:xycolourprimaries" value="ColorGamut"/>", the color space is indicated. For example, in the case of "BT.709-5", "bt709" or "1" is described in the "ColorGamut" part. In addition, for example, in the case of "BT.2020", "bt2020" or "9" is described in the "ColorGamut" part. In addition, for example, in the case of "SMPTE 428 or XYZ", "st428" or "10" is described in the part of "ColorGamut".

In the MPD file, there is a first Representation corresponding to the first video stream including the encoded image data of the first and second image data, and there is a second Representation corresponding to the second video stream including the third and fourth image data. In addition, in the Representation of the first video stream, there are SubRepresentations corresponding to the encoded image data of the first and second image data, respectively. In addition, in the Representation of the second video stream, there are SubRepresentations corresponding to the encoded image data of the third and fourth image data, respectively.

By the description of "<BaseURL>videostreamBase.mp4</BaseURL>", the location of the first video stream is indicated as "videostreamBase.mp4". In the SubRepresentation corresponding to the encoded image data of the first image data in the Representation of the first video stream, there are descriptions of "width="1920" height="1080" frameRate="60"", "codecs="hev1.xx.xx.L123,xx"", and "level="0"". With the descriptions, it is indicated that a 2K 60P stream is achieved, level "0" is given as tag information, and the level of the encoded image data of the first image data is "123".

In the SubRepresentation corresponding to the encoded image data of the second image data in the Representation of the first video stream, there are descriptions of "width="1920" height="1080" frameRate="120"", "codecs="hev1.xx.xx.L150,xx"", "level="1", and "dependencyLevel="0"". With the descriptions, it is indicated that a 2K 120P stream is achieved on the encoded image data of the first image data by enhancement, the level "1" is given as tag information, and the overall level of the encoded image data of the second and first image data is "150".

In addition, by the description of "<BaseURL>video-bitstreamScalable.mp4</BaseURL>", the location of the second video stream is indicated as "video-bitstreamScalable.mp4". In the SubRepresentation corresponding to the encoded image data of the third image data in the Representation of the second video stream, there are descriptions of "width="3840" height="2160" frameRate="60"", "codecs="hev1.yy.yy.L153, yy", "level="2"", and "dependencyLevel="0"". With the descriptions, it is indicated that a 4K 60P stream is achieved on the encoded image data of the first image data by enhancement, the level "2" is given as tag information, and the overall level of the encoded image data of the third and first image data is "153".

In the SubRepresentation corresponding to the encoded image data of the fourth image data in the Representation of the second video stream, there are descriptions of "width="3840" height="2160" frameRate="120"", "codecs="hev1.yy.yy.L156,yy"", "level="3"", and "dependencyLevel="0","1","2"". With the descriptions, it is indicated that a 2K 120P stream is achieved on the encoded image data of the first image data by enhancement and a 4K 120P stream is achieved by adding an enhancement component on the stream, the level "3" is given as tag information, and the overall level of the encoded image data of the fourth to first image data is "156".

FIG. 17 illustrates a description example of the MPD file in the case of transmission of a four-stream configuration (in the case of Case 2). Here, for simplicity of description, an example is shown in which only the information associated with the video stream is described; however, information associated with other media streams of the video stream is also described, actually.

By description of "<AdaptationSet mimeType="video/mp4" codecs="hev1.xx.xx.L123,xx, hev1.xx.xx.L150,xx, hev1.yy.yy.L153,yy, hev1.yy.yy.L156,yy"", it is indicated that there is an AdaptationSet for a video stream, the video stream is supplied in an MP4 file structure, and there are HEVC encoded image data of a level of 123, of a level of 150, a level of 153, and a level of 156.

Since descriptions of "<SupplementaryDescriptor schemeIdUri="urn:brdcst:video:highdynamicrange" value="HDR"/>", "<SupplementaryDescriptor schemeIdUri="urn:brdcst:video:transferfunction" value="EOTFtype"/>", and "<SupplementaryDescriptor schemeIdUri="urn:brdcst:video:xycolourprimaries" value="ColorGamut"/>" are the same as those of the example in FIG. 15, the description thereof will be omitted.

In the MPD file, there are first, second third, and fourth Representations respectively corresponding to the first, second, third, and fourth video streams including the encoded image data of the respective first, second, third and fourth image data.

In the Representation of the first video stream, there are descriptions of "width="1920" height="1080" frameRate="60"", "codecs="hev1.xx.xx.L123,xx"", and "level="0"". With the descriptions, it is indicated that a 2K 60P stream is achieved, level "0" is given as tag information, and the level of the encoded image data of the first image data is "123". By the description of "<BaseURL>videobase1subbitstream.mp4</BaseURL>", the location of the first video stream is indicated as "videobase1subbitstream.mp4".

In the Representation of the second video stream, there are descriptions of "width="1920" height="1080" frameRate="120"", "codecs="hev1.xx.xx.L150,xx"", "level="1"", and "dependencyLevel="0"". With the descriptions, it is indicated that a 2K 120P stream is achieved on the encoded image data of the first image data by enhancement, the level "1" is given as tag information, and the overall level of the encoded image data of the second and first image data is "150". By the description of "<BaseURL>videobase2subbitstream.mp4</BaseURL>", the location of the second video stream is indicated as "video-base2subbitstream.mp4".

In the Representation of the third video stream, there are descriptions of "width="3840" height="2160" frameRate="60"", "codecs="hev1.yy.yy.L153,yy"", "level="2"", and "dependencyLevel="Q"". With the descriptions, it is indicated that a 4K 60P stream is achieved on the encoded image data of the first image data by enhancement, the level "2" is given as tag information, and the overall level of the encoded image data of the third and first image data is "153". By the description of "<BaseURL>video-e1subbitstream.mp4</BaseURL>", the location of the third video stream is indicated as "video-e1subbitstream.mp4".

In the Representation of the fourth video stream, there are descriptions of "width="3840" height="2160" frameRate="120"", "codecs="hev1.yy.yy.L156,yy"", "level="3"", and "dependencyLevel="0","1","2"". With the descriptions, it is indicated that a 2K 120P stream is achieved on the encoded image data of the first image data by enhancement and a 4K 120P stream is achieved by adding an enhancement component on the stream, the level "3" is given as tag information, and the overall level of the encoded image data of the fourth to first image data is "156". By the description of "<BaseURL>video-e2subset.mp4</BaseURL>", the location of the fourth video stream is indicated as "video-e2subset.mp4".

"Example Configuration of Service Transmission System"

FIG. 18 illustrates an example configuration of the service transmission system 100. The service transmission system 100 includes a control unit 101, a high-dynamic-range (HDR) photoelectric conversion unit 102, an RGB/YCbCr conversion unit 103, the video encoder 104, a container encoder 105, and a transmission unit 106.

The control unit 101 includes a Central Processing Unit (CPU), and controls operation of each unit of the service transmission system 100 on the basis of a control program. The HDR photoelectric conversion unit 102 obtains HDR transmission image data V1 by performing photoelectric conversion by applying the HDR photoelectric conversion characteristic to high-frame-rate ultra-high-definition (for example, 4K 120P) and high-dynamic-range (HDR) image data (video data) Vh. The HDR transmission video data V1 is a video material produced as an image with an HDR OETF. For example, a characteristic of STD-B67 (Hybrid Log-Gamma: HLG), a characteristic of ST2084 (Perceptual Quantizer curve: PQ curve), or the like is applied as the HDR photoelectric conversion characteristic.

FIG. 19 illustrates examples of photoelectric conversion characteristics of a standard dynamic range (SDR) and a high dynamic range (HDR). In the figure, the horizontal axis indicates an input luminance level and the vertical axis indicates a transmission code value. The broken line indicates an SDR photoelectric conversion characteristic (BT.709: gamma characteristic). In the SDR photoelectric conversion characteristic, when the input luminance level is an SDR characteristic representation limit luminance SL, the transmission code value is a peak level MP. Here, SL is 100 cd/m$^2$.

The solid line b indicates the characteristic of STD-B67 (HLG) as the HDR photoelectric conversion characteristic. The one-dot chain line c indicates the characteristic of ST2084 (PQ curve) as the HDR photoelectric conversion characteristic. In the HDR photoelectric conversion characteristics, when the input luminance level is a peak luminance PL, the transmission code value is a peak level MP.

The characteristic of STD-B67 (HLG) includes a compatible area with the SDR photoelectric conversion characteristic (BT.709: gamma characteristic). That is, curves of the two characteristics coincide with each other from the input luminance level of zero to a compatibility limit value of both characteristics. When the input luminance level is the compatibility limit value, the transmission code value is a compatibility level SP. The characteristic of ST2084 (PQ curve) is a curve of a quantization step that corresponds to high luminance and is said to be compatible with human visual characteristics.

Referring back to FIG. 18, the RGB/YCbCr conversion unit 103 converts the HDR transmission video data V1 obtained by the HDR photoelectric conversion unit 102, from the RGB domain to the YCbCr (luminance and chrominance) domain. Note that, these color space domains are not limited to the RGB domain, and the luminance and chrominance domain is not limited to YCbCr.

The video encoder 104 applies encoding, for example, MPEG 4-AVC or HEVC, to the HDR transmission video data V1 converted to the YCbCr domain to obtain encoded image data, and generates a predetermined number of video streams including the encoded image data.

That is, in a case where transmission is performed of Case 1 and Case 2, the first video stream including the encoded image data of the first and second image data and the second video stream including the encoded image data of the third and fourth image data are generated (See FIGS. 6, 7, and 11). On the other hand, in a case where transmission is performed of Case 3, the first video stream including the encoded image data of the first image data, the second video stream including the encoded image data of the second image data, the third video stream including the encoded image data of the third image data, and the fourth video stream including the encoded image data of the fourth image data are generated (see FIGS. 6 and 14).

At this time, the video encoder 104 inserts conversion characteristic information (transferfunction) indicating a photoelectric conversion characteristic of the HDR transmission image data V1 or an electro-optical conversion characteristic corresponding to the photoelectric conversion characteristic, into an area of video usability information (VUI) of an SPS NAL unit of an access unit (AU). Note that, in a case where the photoelectric conversion characteristic of the HDR transmission image data V1 is STD-B67 (HLG), conversion characteristic information indicating BT.709 (gamma characteristic) is inserted into the area of the VUI. In this case, the conversion characteristic information indicating STD-B67 (HLG) is arranged in a newly defined transfer function SEI message (transfer_function SEI message) described later that is inserted into the "SEIs" part of the access unit (AU).

In addition, in a case where the characteristic of ST2084 (PQ curve) is applied as the HDR photoelectric conversion characteristic in the HDR photoelectric conversion unit 102 described above, the video encoder 104 inserts a newly defined dynamic range conversion SEI message (Dynamic_range_conv SEI message) described later that includes conversion information of dynamic range conversion, into the "SEIs" part of the access unit (AU). The conversion information is conversion information for conversion of the value of the conversion data by the characteristic of ST2084 (PQ curve) into the value of the conversion data by the SDR photoelectric conversion characteristic.

With reference to FIG. 20, the conversion information of the dynamic range conversion will be further described. The solid line a indicates an example of an SDR OETF curve indicating the SDR photoelectric conversion characteristic. The solid line b indicates an example of the characteristic of the ST2084 (PQ curve) as an HDR OETF curve. The horizontal axis indicates an input luminance level, P1 indicates an input luminance level corresponding to the SDR peak level, and P2 indicates an input luminance level corresponding to the HDR maximum level.

In addition, the vertical axis indicates a transmission code value or a relative value of a normalized encoding level. A relative maximum level M indicates the HDR maximum level and the SDR maximum level. A reference level G indicates a transmission level of the HDR OETF at the input luminance level P1 corresponding to the SDR maximum level, which means a so-called reference white level, and a range higher than the level is used for sparkle representation specific to the HDR. A branch level B indicates a level at which the SDR OETF curve and the HDR OETF curve branch from the same trajectory. Pf indicates an input luminance level corresponding to the branch level. Note that, the branch level B can be an arbitrary value of greater than or equal to 0. Note that, in a case where the branch level is not specified, it is approximated by a corresponding distribution operation method or by obtaining with a ratio from the whole on the reception side.

The conversion information of the dynamic range conversion is information for conversion from the branch level B to the relative maximum level M in the HDR transmission image data, into the value of the conversion data by the SDR photoelectric conversion characteristic, and is a conversion coefficient, or a conversion table. In a case where the information is given by the conversion table, the dynamic range conversion is performed by referring to the conversion table. On the other hand, in a case where the information is given by the conversion coefficient, the dynamic range conversion is performed by calculation using the conversion coefficient. For example, when the conversion coefficient is C, conversion can be performed on the input data from the branch level B to the relative maximum level G, by the following equation (1).

$$\text{Output data} = \text{branch level } B + (\text{input data} - \text{branch level } B) * C \quad (1)$$

Figure 21:
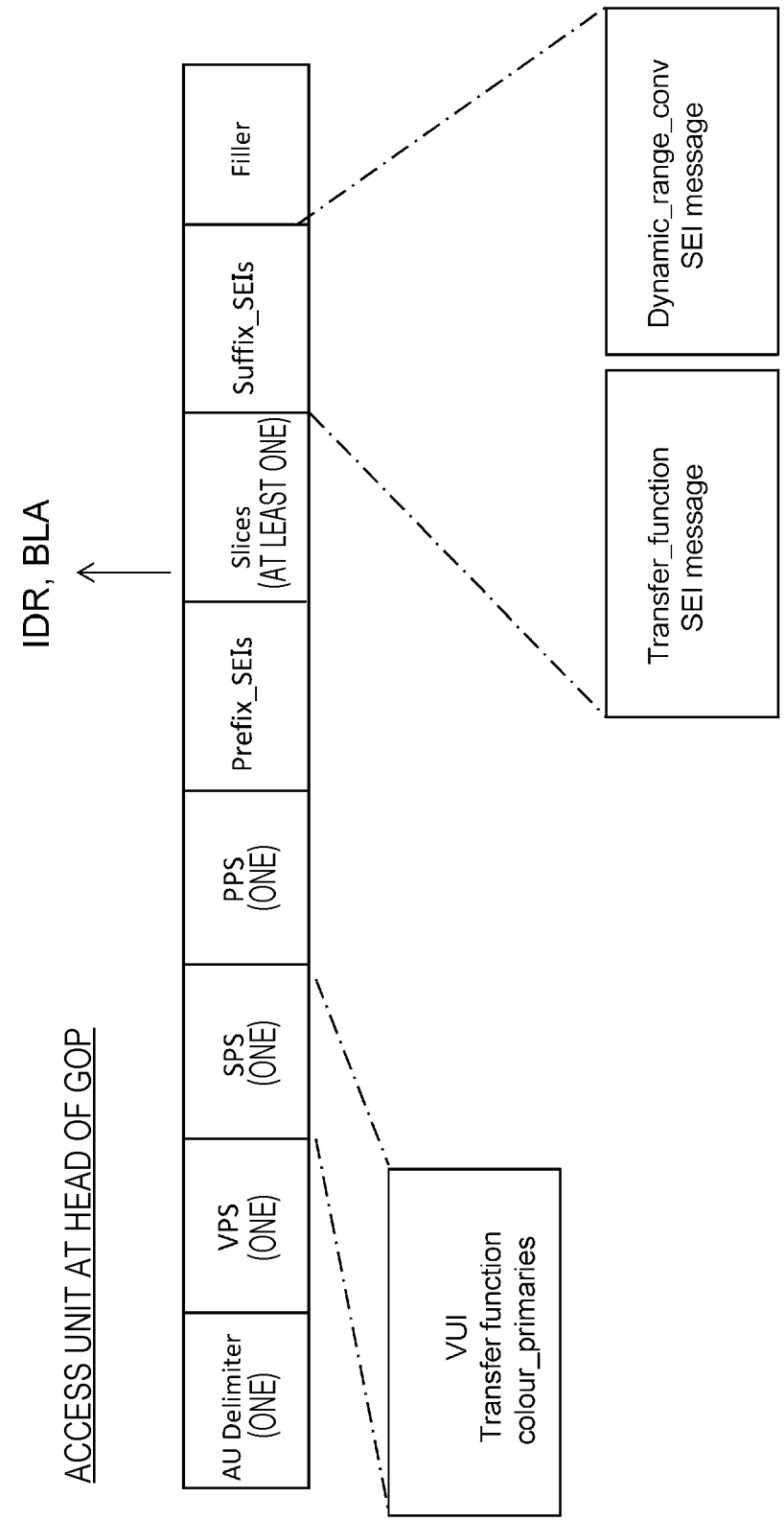
FIG. 21 is a diagram illustrating an access unit at the head of a GOP in a case where an encoding method is HEVC.

FIG. 21 illustrates an access unit at the head of a Group Of Pictures (GOP) in a case where an encoding method is HEVC. In the case of the HEVC encoding method, an SEI message group for decoding "Prefix_SEIs" is arranged before slices in which pixel data is encoded, and after the slices, an SEI message group for display "Suffix_SEIs" is arranged. The transfer function SEI message and the dynamic range conversion SEI message are arranged as the SEI message group "Suffix_SEIs", for example, as illustrated in the figure.

FIG. 22(a) illustrates an example structure (Syntax) of the transfer function SEI message. FIG. 22(b) illustrates details (Semantics) of main information in the example structure. The 8-bit field of "transferfunction" indicates a photoelectric conversion characteristic of the transmission video data V1 or an electro-optical conversion characteristic corresponding to the photoelectric conversion characteristic. In a case where the value of this element differs from the value of "transferfunction" of the VUI, replacement is performed with the value of this element.

For example, "1" indicates "BT.709-5 Transfer Function (SDR)", "14" indicates "10 bit BT.2020 Transfer Function (SDR)", "16" indicates "SMPTE 2084 Transfer Function (HDR1)", and "18" indicates "ARIB STD B-67 Transfer Function (HDR2)".

The 16-bit field of "peak_luminance" indicates the maximum luminance level. The maximum luminance level indicates the maximum luminance level of a content, for example, within a program or a scene. In the reception side, this value can be used as a reference value when a display image suitable for display capability is created. The 8-bit field of "color_space" indicates color space information.

FIG. 23 illustrates an example structure (Syntax) of the dynamic range conversion SEI message. FIG. 24 illustrates details (Semantics) of main information in the example structure. The 1-bit flag information of "Dynamic_range_conv_cancel_flag" indicates whether a message of "Dynamic_range_conv" is to be refreshed. "0" indicates that the message of "Dynamic_range_conv" is to be refreshed. "1" indicates that the message of "Dynamic_range_conv" is not to be refreshed, that is, the previous message is maintained as it is.

When "Dynamic_range_conv_cancel_flag" is "0", the following fields exist. The 8-bit field of "coded_data_bit_depth" indicates the encoded pixel bit depth (the bit depth of the transmission code value). The 14-bit field of "reference_level" indicates a reference luminance level value, that is, the reference level G (see FIG. 20). The 1-bit flag information of "ratio_conversion_flag" indicates that simple conversion is performed, that is, the conversion coefficient exists. The 1-bit flag information of "conversion_table_flag" indicates that the conversion is based on the conversion table, that is, conversion table information exists. The 16-bit field of "branch_level" indicates the branch level B (see FIG. 20).

When "ratio_conversion_flag" is "1", the 8-bit field of "level_conversion_ratio" exists. The field indicates the conversion coefficient (ratio of level conversion). When "conversion_table_flag" is "1", the 8-bit field of "table_size" exists. The field indicates the number of inputs in the conversion table. Then, 16-bit fields of "level_R [i]", "level_G [i]", and "level_B [i]" exist for the number of inputs. The field of "level_R [i]" indicates a value after conversion of a red component (Red component). The field of "level_G [i]" indicates a value after conversion of a green component (Red component). The field of "level_B [i]" indicates a value after conversion of a blue component (Red component).

Note that, when the encoded pixel bit depth is 8 bits, a value exists corresponding to each value of the input data. However, when the encoded pixel bit depth is 10 bits, 12 bits, or the like, only values corresponding to respective values of the upper 8 bits of the input data exist. In this case, when the conversion table is used in the reception side, an interpolation value is used for values of the remaining lower bits.

Referring back to FIG. 18, the container encoder 105 generates a container including a predetermined number of video streams VS generated by the video encoder 104, here, an MP4 stream, as a distribution stream STM.

That is, in a case where transmission is performed of Case 1 and Case 2, an MP4 stream including the first video stream including the encoded image data of the first and second image data and an MP4 stream including the second video stream including the encoded image data of the third and fourth image data are generated (see FIGS. 6, 7, and 11).

On the other hand, in a case where transmission is performed of Case 3, an MP4 stream including the first video stream including the encoded image data of the first image data, an MP4 stream including the second video stream including the encoded image data of the second image data, an MP4 stream including the third video stream including the encoded image data of the third image data, and an MP4 stream including the fourth video stream including the encoded image data of the fourth image data are generated (see FIGS. 6 and 14).

The transmission unit 106 transmits the MP4 distribution stream STM obtained by the container encoder 105 on a broadcast wave or a network packet to the service receiver 200.

Operation of the service transmission system 100 illustrated in FIG. 18 will be briefly described. The high-frame-rate ultra-high-definition (for example, 4K 120P) and high-dynamic-range (HDR) image data (video data) Vh is supplied to the HDR photoelectric conversion unit 102. In the HDR photoelectric conversion unit 102, photoelectric conversion is applied to the HDR video data Vh by the HDR photoelectric conversion characteristic, and HDR transmission video data is obtained as a video material produced as an image with an HDR OETF. For example, the characteristic of STD-B67 (HLG), the characteristic of ST2084 (PQ curve), or the like is applied as the HDR photoelectric conversion characteristic.

The HDR transmission video data V1 obtained by the HDR photoelectric conversion unit 102 is converted from the RGB domain to the YCbCr domain by the RGB/YCbCr conversion unit 103, and then supplied to the video encoder 104. In the video encoder 104, encoding, for example, MPEG 4-AVC or HEVC is applied to the HDR transmission video data V1 converted to the YCbCr domain and encoded image data is obtained, and a predetermined number of video streams is generated including the encoded image data.

That is, in a case where transmission is performed of Case 1 and Case 2, the first video stream including the encoded image data of the first and second image data and the second video stream including the encoded image data of the third and fourth image data are generated (See FIGS. 6, 7, and 11). On the other hand, in a case where transmission is performed of Case 3, the first video stream including the encoded image data of the first image data, the second video stream including the encoded image data of the second image data, the third video stream including the encoded image data of the third image data, and the fourth video stream including the encoded image data of the fourth image data are generated (see FIGS. 6 and 14).

At this time, in the video encoder 104, the conversion characteristic information (transferfunction) indicating the photoelectric conversion characteristic of the HDR transmission video data V1 or the electro-optical conversion characteristic corresponding to the photoelectric conversion characteristic is inserted into the area of the VUI of the SPS NAL unit of the access unit (AU). Note that, in a case where the photoelectric conversion characteristic of the HDR transmission video data V1 is STD-B67 (HLG), the conversion characteristic information indicating BT.709 (gamma characteristic) is inserted into the area of the VUI. In this case, the conversion characteristic information indicating STD-B67 (HLG) is arranged in the transfer function SEI message (see FIG. 22) inserted into the "SEIs" part of the access unit (AU).

In addition, at this time, in a case where the characteristic of ST2084 (PQ curve) is applied as the HDR photoelectric conversion characteristic in the HDR photoelectric conversion unit 102, in the video encoder 104, dynamic range conversion SEI message (see FIG. 23) including the conversion information of dynamic range conversion is inserted into the "SEIs" part of the access unit (AU). The conversion information is conversion information for conversion of the value of the conversion data by the characteristic of ST2084 (PQ curve) into the value of the conversion data by the SDR photoelectric conversion characteristic.

The predetermined number of video streams VS generated by the video encoder 104 is supplied to the container encoder 105. In the container encoder 105, the container including the predetermined number of video streams VS, here, the MP4 stream, is generated as the distribution stream STM.

That is, in a case where transmission is performed of Case 1 and Case 2, an MP4 stream including the first video stream including the encoded image data of the first and second image data and an MP4 stream including the second video stream including the encoded image data of the third and fourth image data are generated (see FIGS. 6, 7, and 11).

On the other hand, in a case where transmission is performed of Case 3, an MP4 stream including the first video stream including the encoded image data of the first image data, an MP4 stream including the second video stream including the encoded image data of the second image data, an MP4 stream including the third video stream including the encoded image data of the third image data, and an MP4 stream including the fourth video stream including the encoded image data of the fourth image data are generated (see FIGS. 6 and 14).

The MP4 stream generated as the distribution stream STM by the container encoder 105 is supplied to the transmission unit 106. In the transmission unit 106, the MP4 distribution stream STM obtained by the container encoder 105 is transmitted on the broadcast wave or the network packet to the service receiver 200.

"Example Configuration of Service Receiver"

Figure 25:
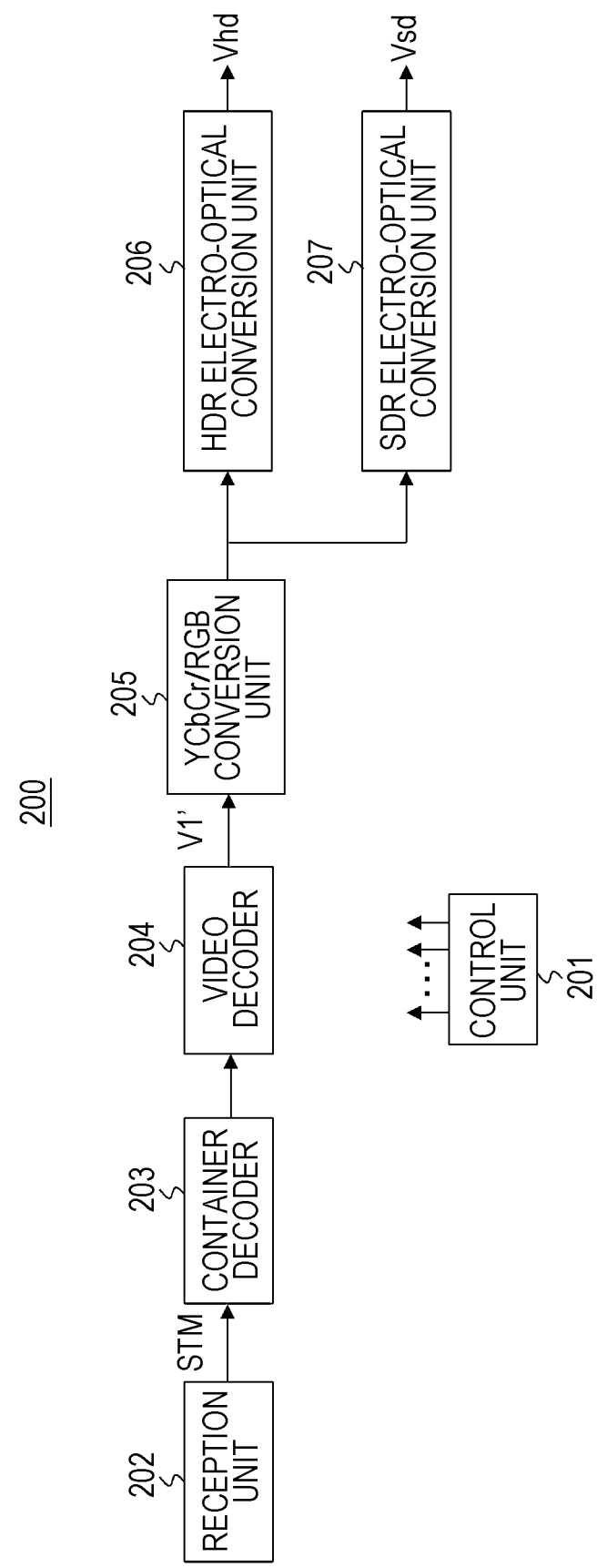
FIG. 25 is a block diagram illustrating an example configuration of a service receiver.

FIG. 25 illustrates an example configuration of the service receiver 200. The service receiver 200 includes a control unit 201, a reception unit 202, a container decoder 203, a video decoder 204, a YCbCr/RGB conversion unit 205, an HDR electro-optical conversion unit 206, and an SDR electro-optical conversion unit 207.

The control unit 201 includes a Central Processing Unit (CPU), and controls operation of each unit of the service receiver 200 on the basis of a control program. The reception unit 202 receives the MP4 distribution stream STM transmitted on the broadcast wave or the network packet from the service transmission system 100.

Under the control of the control unit 201, depending on the decoding capability of the receiver 200, the container decoder (multiplexer) 103 selectively extracts the encoded image data of the required image data, on the basis of information of the "moof" block and the like, from the MP4 distribution stream STM received by the reception unit 202, and transmits the encoded image data to the video decoder 204.

For example, when the receiver 200 has a decoding capability capable of processing high-frame-rate ultra-high-definition image data, the container decoder 203 extracts encoded image data of all the first to fourth image data, and transmits the encoded image data to the video decoder 204. In addition, for example, when the receiver 200 has a decoding capability capable of processing base-frame-rate ultra-high-definition image data, the container decoder 203 extracts encoded image data of the first and third image data, and transmits the encoded image data to the video decoder 204.

In addition, for example, when the receiver 200 has a decoding capability capable of processing high-frame-rate high-definition image data, the container decoder 203 extracts encoded image data of the first and second image data, and transmits the encoded image data to the video decoder 204. In addition, for example, when the receiver 200 has a decoding capability capable of processing base-frame-rate high-definition image data, the container decoder 203 extracts encoded image data of the first image data, and transmits the encoded image data to the video decoder 204.

For example, the container decoder 203 checks a level value (tlevel_idc) inserted into the container, compares the level value with the decoding capability of the video decoder 204, and determines whether or not reception is possible. At that time, a value corresponding to complexity (general_level_idc) of the entire stream in the received video stream is detected from "tlevel_idc" in the "moof" block.

Then, in a case where the detected value is higher than the decoding capability of the receiver, the container decoder 203 checks "tlevel_idc" in the "moof" block corresponding to a value of another element (sublayer_level_idc) in the video stream, determines whether decoding is possible within the applicable range, and transfers the encoded image data of the corresponding image data to the video decoder 204.

On the other hand, a value corresponding to the complexity (general_level_idc) of the entire stream in the received video stream is detected from "tlevel_idc" in the "moof" block, and in a case where the value corresponds to the decoding capability of the receiver, the container decoder 203 transfers the encoded image data of all the image data included in the received video stream to the video decoder 204 in the order of decoding time stamps.

The video decoder 204 applies decoding processing to the encoded image data selectively extracted by the container decoder 203 to obtain HDR transmission video data V1'. For example, when the receiver 200 has a decoding capability capable of processing high-frame-rate ultra-high-definition image data, the HDR transmission video data V1' becomes image data for display of a high-frame-rate ultra-high-definition image. In addition, for example, when the receiver 200 has a decoding capability capable of processing base-frame-rate ultra-high-definition image data, the HDR transmission video data V1' becomes image data for display of a base-frame-rate ultra-high-definition image.

In addition, for example, when the receiver 200 has a decoding capability capable of processing high-frame-rate high-definition image data, the HDR transmission video data V1' becomes image data for display of a high-frame-rate high-definition image. In addition, for example, when the receiver 200 has a decoding capability capable of processing base-frame-rate high-definition image data, the HDR transmission video data V1' becomes image data for display of a base-frame-rate high-definition image.

In addition, the video decoder 204 extracts the parameter set and the SEI message inserted into the encoded image data selectively extracted by the container decoder 203, and transmits them to the control unit 201.

The extracted information also includes conversion characteristic information (transferfunction) indicating the photoelectric conversion characteristic of the transmission video data V1 inserted into the area of the VUI of the SPS NAL unit of the above-described access unit or the electro-optical conversion characteristic corresponding to the photoelectric conversion characteristic, and the transfer function SEI message (see FIG. 22). With the information, the control unit 201 recognizes the HDR photoelectric conversion characteristic applied to the HDR transmission video data V1'.

In addition, when the HDR photoelectric conversion characteristic applied to the HDR transmission video data V1' is the characteristic of ST2084 (PQ curve), the extracted information also includes the dynamic range conversion SEI message (see FIG. 23). With the information, the control unit 201 recognizes dynamic range conversion information (conversion table, conversion coefficient).

The YCbCr/RGB conversion unit 205 converts the HDR transmission video data V1' obtained by the video decoder 204 from the YCbCr (luminance and chrominance) domain to the RGB domain. The HDR photoelectric conversion unit 206 obtains display video data Vhd for display of an HDR image by applying the HDR electro-optical conversion characteristic to the HDR transmission video data V1' converted to the RGB domain. In this case, the control unit 201 sets, for the HDR photoelectric conversion unit 206, the HDR electro-optical conversion characteristic recognized from the VUI or the transfer function SEI message, that is, the HDR electro-optical conversion characteristic corresponding to the HDR photoelectric conversion characteristic applied in the transmission side.

The SDR photoelectric conversion unit 207 obtains display video data Vsd for display of the SDR image by applying the SDR electro-optical conversion characteristic to the HDR transmission video data V1' converted to the RGB domain. Here, when the HDR photoelectric conversion characteristic applied to the HDR transmission video data V1' is the characteristic of STD-B67 (HLG), the SDR photoelectric conversion unit 207 obtains the display video data Vsd for display of the SDR image by directly applying the SDR electro-optical conversion characteristic to the HDR transmission video data V1'.

On the other hand, when the HDR photoelectric conversion characteristic applied to the HDR transmission video data V1' is the characteristic of ST2084 (PQ curve), the SDR photoelectric conversion unit 207 obtains SDR transmission image data by performing, on the HDR transmission video data V1', dynamic range conversion on the basis of the dynamic range conversion information (conversion table, conversion coefficient), and obtains the display video data Vsd for display of the SDR image by applying the SDR electro-optical conversion characteristic to the SDR transmission image data.

Figure 26:
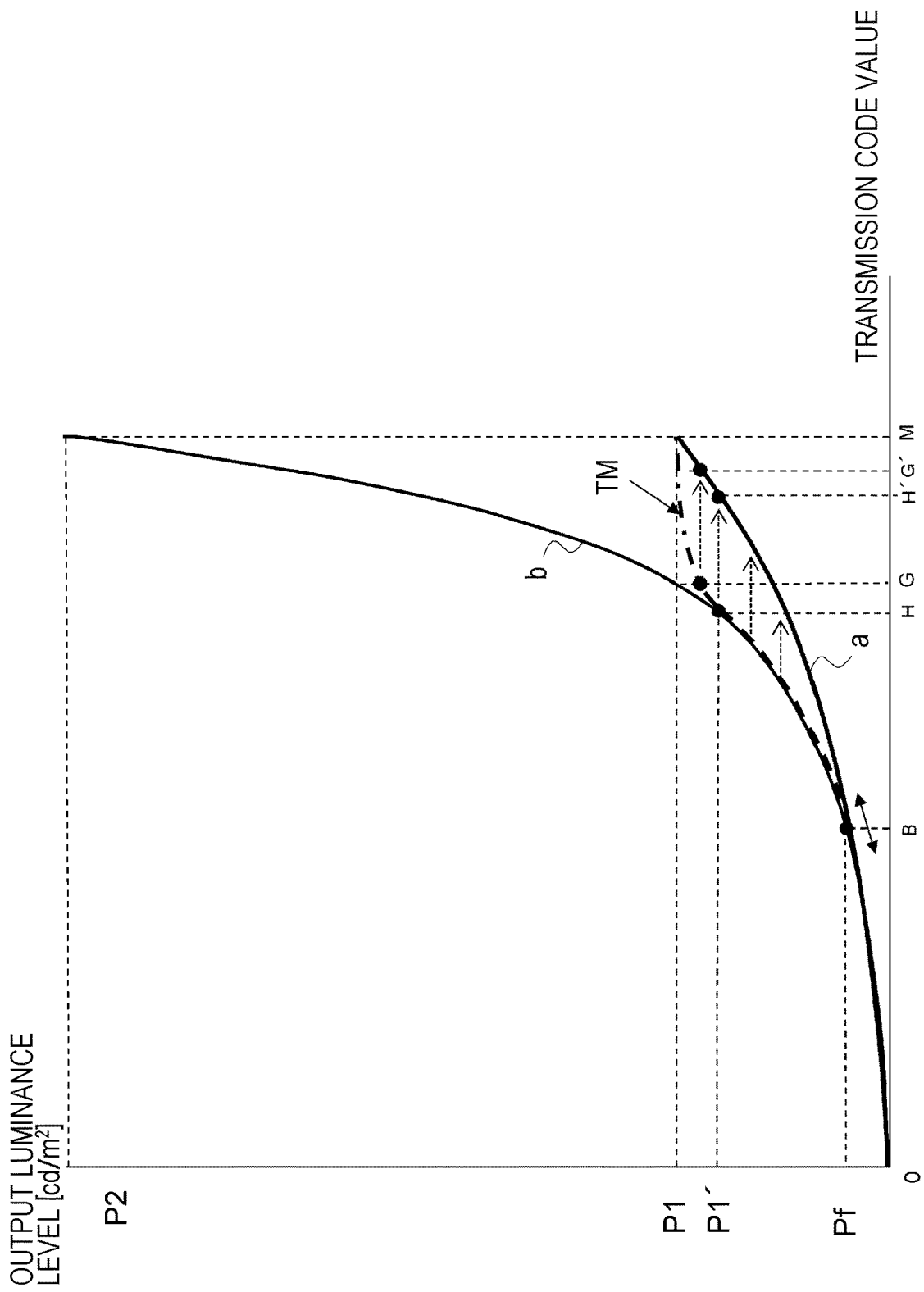
FIG. 26 is a diagram for describing details of dynamic range conversion.

With reference to FIG. 26, an example of the dynamic range conversion based on the dynamic range conversion information will be described. The vertical axis indicates an output luminance level, which corresponds to the horizontal axis in FIG. 20. In addition, the horizontal axis indicates a transmission code value, which corresponds to the vertical axis in FIG. 20. The solid line a is an SDR EOTF curve indicating the SDR electro-optical conversion characteristic. The SDR EOTF curve corresponds to the SDR OETF curve indicated by the solid line in FIG. 20. The solid line b is an HDR EOTF curve indicating the HDR electro-optical conversion characteristic. The HDR EOTF curve corresponds to the characteristic of ST2084 (PQ curve) as the HDR OETF curve indicated by the solid line b in FIG. 20. Note that, P1' indicates an output luminance level corresponding to a predetermined level H lower than the reference level G.

In the dynamic range conversion, input data up to the predetermined level H lower than the reference level G among the HDR transmission video data V1' is converted so as to coincide with the value of the conversion data by the SDR photoelectric conversion characteristic. Input data less than branch level B is set to output data as it is.

In addition, for input data from the level H to the level M, dynamic range level conversion is performed on the basis of a tone mapping characteristic TM indicated by the one-dot chain line. In this case, for example, the level H is converted to a level H', the reference level G is converted into a level G', and the level M is set to the level M as it is. As described above, the level conversion based on the tone mapping characteristic TM is performed on the input data from the level H to the level M, whereby it becomes possible to reduce the image quality degradation due to the level saturation from the reference level G to the relative maximum level M.

Operation of the service receiver 200 illustrated in FIG. 25 will be briefly described. In the reception unit 202, the MP4 distribution stream STM transmitted on the broadcast wave or the network packet from the service transmission system 100 is received. The distribution stream STM is supplied to the container decoder 203.

In the container decoder 203, under the control of the control unit 201, depending on the decoding capability of the receiver 200, the encoded image data of the required image data is selectively extracted, on the basis of the "moof" block information and the like, from the MP4 distribution stream STM received by the reception unit 202, and supplied to the video decoder 204.

For example, when the receiver 200 has a decoding capability capable of processing high-frame-rate ultra-high-definition image data, in the container decoder 203, the encoded image data of all the first to fourth image data are extracted, and supplied to the video decoder 204. In addition, for example, when the receiver 200 has a decoding capability capable of processing base-frame-rate ultra-high-definition image data, in the container decoder 203, the encoded image data of the first and third image data are extracted, and supplied to the video decoder 204.

In addition, for example, when the receiver 200 has a decoding capability capable of processing high-frame-rate high-definition image data, in the container decoder 203, the encoded image data of the first and second image data are extracted, and supplied to the video decoder 204. In addition, for example, when the receiver 200 has a decoding capability capable of processing base-frame-rate high-definition image data, in the container decoder 203, the encoded image data of the first image data is extracted, and supplied to the video decoder 204.

In the video decoder 204, decoding processing is applied to the encoded image data selectively extracted by the container decoder 203, and the HDR transmission video data V1' is obtained. For example, when the receiver 200 has a decoding capability capable of processing high-frame-rate ultra-high-definition image data, the HDR transmission video data V1' is image data for display of a high-frame-rate ultra-high-definition image. In addition, for example, when the receiver 200 has a decoding capability capable of processing base-frame-rate ultra-high-definition image data, the HDR transmission video data V1' is image data for display of a base-frame-rate ultra-high-definition image.

In addition, for example, when the receiver 200 has a decoding capability capable of processing high-frame-rate high-definition image data, the HDR transmission video data V1' is image data for display of a high-frame-rate high-definition image. In addition, for example, when the receiver 200 has a decoding capability capable of processing base-frame-rate high-definition image data, the HDR transmission video data V1' is image data for display of a base-frame-rate high-definition image.

In addition, in the video decoder 204, the parameter set and the SEI message inserted into the encoded image data selectively extracted by the container decoder 203 are extracted and transmitted to the control unit 201.

In the control unit 201, on the basis of the conversion characteristic information (transferfunction) indicating the photoelectric conversion characteristic of the transmission video data V1 inserted into the area of the VUI of the SPS NAL unit or the electro-optical conversion characteristic corresponding to the photoelectric conversion characteristic, and the transfer function SEI message (See FIG. 22), the HDR photoelectric conversion characteristic applied to the HDR transmission video data V1' is recognized. In addition, in the control unit 201, on the basis of the dynamic range conversion SEI message (see FIG. 23), the dynamic range conversion information (conversion table, conversion coefficient) is recognized.

The HDR transmission video data V1' obtained by the video decoder 204 is converted from the YCbCr domain to the RGB domain by the YCbCr/RGB conversion unit 205, and then supplied to the HDR electro-optical conversion unit 206 or the SDR electro-optical conversion unit 207.

In the HDR photoelectric conversion unit 206, the HDR electro-optical conversion characteristic is applied to the HDR transmission video data V1' converted to the RGB domain, and the display video data Vhd for display of the HDR image is obtained. In this case, for the HDR photoelectric conversion unit 206, under the control of the control unit 201, the HDR electro-optical conversion characteristic is set recognized from the VUI or the transfer function SEI message, that is, the HDR electro-optical conversion characteristic corresponding to the HDR photoelectric conversion characteristic applied in the transmission side.

In the SDR electro-optical conversion unit 207, the SDR electro-optical conversion characteristic is applied to the HDR transmission video data V1' converted to the RGB domain, and the display video data Vsd for display of the SDR image is obtained. In this case, when the HDR photoelectric conversion characteristic applied to the HDR transmission video data V1' is the characteristic of STD-B67 (HLG), the SDR electro-optical conversion characteristic is directly applied to the HDR transmission video data V1'.

In addition, in this case, when the HDR photoelectric conversion characteristic applied to the HDR transmission video data V1' is the characteristic of ST2084 (PQ curve), the dynamic range conversion is performed on the basis of the dynamic range conversion information (conversion table, conversion coefficient) to the HDR transmission video data V1', and SDR transmission image data is obtained (see FIG. 26), and the SDR electro-optical conversion characteristic is applied to the SDR transmission image data.

As described above, in the transmission/reception system 10 illustrated in FIG. 3, information is inserted into a container (a "moof" block of an MP4 stream), the information corresponding to information (SPS information) that is inserted into each of the predetermined number of video streams and associated with the image data included in the video streams. Therefore, in the reception side, it becomes easily possible to perform decoding processing by extracting predetermined encoded image data from the first to fourth image data included in the predetermined number of streams, on the basis of the information, depending on decoding capability.

In addition, in the transmission/reception system 10 illustrated in FIG. 3, the conversion characteristic information indicating the HDR photoelectric conversion characteristic or the electro-optical conversion characteristic corresponding to the HDR photoelectric conversion characteristic is inserted into the video stream including the encoded image data of the first image data. Therefore, in the reception side, it becomes easily possible to perform appropriate electro-optical conversion on the basis of the conversion characteristic information.

In addition, in the transmission/reception system 10 illustrated in FIG. 3, when the high-dynamic-range photoelectric conversion characteristic is the characteristic of the PQ curve, conversion information for conversion of a value of conversion data by the characteristic of the PQ curve to a value of conversion data by the standard-dynamic-range photoelectric conversion characteristic is inserted into the video stream including the encoded image data of the first image data. Therefore, when the high-dynamic-range photoelectric conversion characteristic is the characteristic of the PQ curve, in a case where standard-dynamic-range display is performed, it becomes possible to satisfactorily obtain the display image data, in the reception side.

2. Modification

Note that, in the above-described embodiment, the description has been made assuming a configuration in which, in a case where a base stream and an enhancement stream are transmitted on respective different tracks, the enhancement stream depends on the extractor. However, this is merely an example, and in fact it is possible to manage the decoding timing of the enhancement stream even if there is no extractor.

That is, in the case where the base stream and the enhancement stream are transmitted on the respective different tracks, regarding the track including the enhancement stream, at least the first offset information of the track is described in a box "baseMediaDecodeTime" in the decoding time (tfdt) of the track fragment (tfdt) of "moof", as delay information in units of 120 Hz, whereby the decoding timing of the enhancement stream is shifted by (1/120) seconds with respect to the decoding timing of the base stream and a similar thing can be achieved."

In addition, in the above-described embodiment, an example in which the container is of MP4 (ISOBMFF) has been described. However, in the present technology, the container is not limited to MP4, and the present technology can be similarly applied even to containers of other formats such as MPEG-2 TS and MMT.

In addition, the present technology may also be embodied in the configurations described below.

(1) A transmission device including:
an image processing unit that processes high-frame-rate ultra-high-definition image data to obtain first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high-definition image by being used with the first to third image data;
a transmission unit that transmits a container of a predetermined format including a predetermined number of video streams including encoded image data of the first to fourth image data; and
an information insertion unit that inserts information into the container, the information corresponding to information that is inserted into each of the predetermined number of video streams and associated with image data included in the video streams.

(2) The transmission device according to (1), in which the container of the predetermined format transmitted by the transmission unit includes a first video stream including encoded image data of the first image data and encoded image data of the second image data, and a second video stream including encoded image data of the third image data and encoded image data of the fourth image data, and
the information insertion unit
inserts the information into the container in a state in which the first and second video streams are each managed with one track.

(3) The transmission device according to (2), in which the information insertion unit,
when inserting the information into the container,
performs insertion by grouping information associated with the encoded image data of the first image data and information associated with the encoded image data of the second image data, for the first video stream, and
performs insertion by grouping information associated with the encoded image data of the third image data and information associated with the encoded image data of the fourth image data, for the second video stream.

(4) The transmission device according to (2) or (3), in which
a picture of the first image data and a picture of the second image data are encoded alternately in the first video stream, and
a picture of the third image data and a picture of the fourth image data are encoded alternately in the second video stream.

(5) The transmission device according to (1), in which
the container of the predetermined format transmitted by the transmission unit includes a first video stream including encoded image data of the first image data and encoded image data of the second image data, and a second video stream including encoded image data of the third image data and encoded image data of the fourth image data, and
the information insertion unit
inserts the information into the container in a state in which the first and second video streams are each managed with two tracks.

(6) The transmission device according to (5), in which
a picture of the first image data and a picture of the second image data are encoded alternately in the first video stream, and
a picture of the third image data and a picture of the fourth image data are encoded alternately in the second video stream.

(7) The transmission device according to (1), in which
the container of the predetermined format transmitted by the transmission unit includes a first video stream including encoded image data of the first image data, a second video stream including encoded image data of the second image data, a third video stream including encoded image data of the third image data, and a fourth video stream including encoded image data of the fourth image data, and
the information insertion unit
inserts the information in a state in which the first to fourth video streams are each managed with one track.

(8) The transmission device according to any of (1) to (7), in which
the high-frame-rate ultra-high-definition image data is transmission image data having a high-dynamic-range photoelectric conversion characteristic given by performing photoelectric conversion by the high-dynamic-range photoelectric conversion characteristic on high-dynamic-range image data, and
the information insertion unit
further inserts conversion characteristic information indicating the high-dynamic-range photoelectric conversion characteristic or an electro-optical conversion characteristic corresponding to the high-dynamic-range photoelectric conversion characteristic, into a video stream including encoded image data of the first image data.

(9) The transmission device according to (8), in which the high-dynamic-range photoelectric conversion characteristic is a characteristic of Hybrid Log-Gamma.

(10) The transmission device according to (8), in which the high-dynamic-range photoelectric conversion characteristic is a characteristic of a PQ curve.

(11) The transmission device according to (10), in which the information insertion unit
further inserts conversion information for conversion of a value of conversion data by the characteristic of the PQ curve to a value of conversion data by a standard-dynamic-range photoelectric conversion characteristic, into the video stream including the encoded image data of the first image data.

(12) A transmission method including:
an image processing step of processing high-frame-rate ultra-high-definition image data to obtain first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high-definition image by being used with the first to third image data;
a transmission step, by a transmission unit, of transmitting a container of a predetermined format including a predetermined number of video streams including encoded image data of the first to fourth image data; and
an information insertion step of inserting information into the container, the information corresponding to information that is inserted into each of the predetermined number of video streams and associated with image data included in the video streams.

(13) A reception device including
a reception unit that receives a container of a predetermined format including a predetermined number of video streams, in which
the predetermined number of video streams includes first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high-definition image by being used with the first to third image data that are obtained by processing high-frame-rate ultra-high-definition image data,
information is inserted into the container, the information corresponding to information that is inserted into each of the predetermined number of video streams and associated with image data included in the video streams, and
the reception device further includes a processing unit that obtains image data by selectively extracting predetermined encoded image data from encoded image data of the first to fourth image data and performing decoding processing, on the basis of the information inserted into the container, depending on decoding capability.

(14) The reception device according to 13, in which
the high-frame-rate ultra-high-definition image data is transmission image data having a high-dynamic-range photoelectric conversion characteristic given by performing photoelectric conversion by the high-dynamic-range photoelectric conversion characteristic on high-dynamic-range image data,
conversion characteristic information indicating the high-dynamic-range photoelectric conversion characteristic or an electro-optical conversion characteristic corresponding to the high-dynamic-range photoelectric conversion characteristic is inserted into a video stream including the encoded image data of the first image data, and
the processing unit
obtains display image data by performing electro-optical conversion on the image data obtained by the decoding processing on the basis of the conversion characteristic information.

(15) The reception device according to (13), in which
the high-frame-rate ultra-high-definition image data is transmission image data having a high-dynamic-range photoelectric conversion characteristic given by performing photoelectric conversion by the high-dynamic-range photoelectric conversion characteristic on high-dynamic-range image data,
the high-dynamic-range photoelectric conversion characteristic is a characteristic of a PQ curve,
conversion information for conversion of a value of conversion data by the characteristic of the PQ curve to a value of conversion data by a standard-dynamic-range photoelectric conversion characteristic is inserted into a video stream including the encoded image data of the first image data, and
the processing unit,
when performing standard-dynamic-range display,
obtains standard-dynamic-range transmission image data by performing dynamic range conversion on the image data obtained by the decoding processing on the basis of the conversion information, and obtains display image data by performing electro-optical conversion by a standard-dynamic-range electro-optical conversion characteristic on the standard-dynamic-range transmission image data.

(16) A reception method including
a reception step, by a reception unit, of receiving a container of a predetermined format including a predetermined number of video streams, in which
the predetermined number of video streams includes first image data for acquisition of a base-frame-rate high-definition image, second image data for acquisition of a high-frame-rate high-definition image by being used with the first image data, third image data for acquisition of a base-frame-rate ultra-high-definition image by being used with the first image data, and fourth image data for acquisition of a high-frame-rate ultra-high-definition image by being used with the first to third image data that are obtained by processing high-frame-rate ultra-high-definition image data,
information is inserted into the container, the information corresponding to information that is inserted into each of the predetermined number of video streams and associated with image data included in the video streams, and the reception method further includes a processing step of obtaining image data by selectively extracting predetermined encoded image data from encoded image data of the first to fourth image data and performing decoding processing, on the basis of the information inserted into the container, depending on decoding capability.

A main feature of the present technology is that, when a container including a predetermined number of video streams related to spatiotemporal scalability is transmitted, information is inserted into the container (the "moof" block of the MP4 stream), the information corresponding to information (SPS information) that is inserted into each of the predetermined number of video streams and associated with the image data included in the video streams, whereby it is facilitated that the predetermined encoded image data is extracted from the first to fourth image data included in the predetermined number of streams and decoding processing is performed, on the basis of the information, depending on the decoding capability, in the reception side (see FIGS. 7, 11, and 14).

REFERENCE SIGNS LIST

10 Transmission/reception system
30A, 30B MPEG-DASH based stream distribution system
31 DASH stream file server
32 DASH MPD server
33, 33-1 to 33-N Service receiver
34 CDN
35, 35-1 to 35-M Service receiver
36 Broadcast transmission system
100 Service transmission system
101 Control unit
102 HDR photoelectric conversion unit
103 RGB/YCbCr conversion unit
104 Video encoder
105 Container encoder
106 Transmission unit
200, 200A, 200B, 200C, 200D Service receiver
201 Control unit
202 Reception unit
203 Container decoder
204, 204A, 204B, 204C, 204D Video decoder
205 YCbCr/RGB conversion unit
206 HDR electro-optical conversion unit
207 SDR electro-optical conversion unit

The invention claimed is:

1. A reception device comprising:
reception circuitry configured to receive a description and a first video stream including encoded image data of first image data and encoded image data of second image data, and a second video stream including encoded image data of third image data and encoded image data of fourth image data, wherein:
the first image data is for acquisition of image data of a first frame rate and a first resolution, the second image data is for acquisition of image data of a second frame rate and the first resolution based on the first image data, the third image data is for acquisition of image data of the first frame rate and a second resolution based on the first image data, and the fourth image data is for acquisition of image data of the second frame rate and the second resolution based on the first, second, and third image data,
the description indicates a first representation corresponding to the first video stream and a second representation corresponding to the second video stream,
the first video stream includes a first temporal layer for the encoded image data of the first image data and a second temporal layer for the encoded image data of the second image data,
the second video stream includes a third temporal layer for the encoded image data of the third image data and a fourth temporal layer for the encoded image data of the fourth image data, and
the first frame rate is lower than the second frame rate, and the first resolution is lower than the second resolution; and
processing circuitry configured to obtain image data for display by decoding encoded image data included in the first and second video streams based on the description.

2. The reception device according to claim 1, wherein the description is a Media Presentation Description (MPD).

3. The reception device according to claim 1, wherein;
the first video stream includes conversion characteristic information indicating a characteristic of a high-dynamic-range conversion, and
the processing circuitry is configured to perform electro-optical conversion on the obtained image data based on the conversion characteristic information.

4. The reception device according to claim 3, wherein the first video stream further includes maximum luminance information indicating a maximum luminance level, and
the processing circuitry is configured to display the obtained image data based on the maximum luminance information.

5. The reception device according to claim 1, wherein;
the description includes conversion characteristic information indicating a characteristic of a high-dynamic-range conversion, and
the processing circuitry is configured to perform electro-optical conversion on the obtained image data based on the conversion characteristic information.

6. The reception device according to claim 1, wherein:
a picture of the first image data and a picture of the second image data are encoded alternately in the first video stream, and
a picture of the third image data and a picture of the fourth image data are encoded alternately in the second video stream.

7. A reception device comprising:
reception circuitry configured to receive a description and a first video stream including encoded image data of first image data and encoded image data of second image data, and a second video stream including encoded image data of third image data and encoded image data of fourth image data, wherein:
the first image data is for acquisition of image data of a first frame rate and a first resolution, the second image data is for acquisition of image data of a second frame rate and the first resolution based on the first image data, the third image data is for acquisition of image data of the first frame rate and a second resolution based on the first image data, and the fourth image data is for acquisition of image data of the second frame rate and the second resolution based on the first, second, and third image data, the description indicates a first representation corresponding to the first video stream and a second representation corresponding to the second video stream, the first and second video streams are each managed with one track or two tracks; and processing circuitry configured to obtain image data for display by decoding encoded image data included in the first and second video streams based on the description.

8. The reception device according to claim 7, wherein:
a picture of the first image data and a picture of the second image data are encoded alternately in the first video stream, and
a picture of the third image data and a picture of the fourth image data are encoded alternately in the second video stream.

9. The reception device according to claim 7, wherein the description is a Media Presentation Description (MPD).

10. The reception device according to claim 7, wherein:
the first video stream includes conversion characteristic information indicating a characteristic of a high-dynamic-range conversion, and
the processing circuitry is configured to perform electro-optical conversion on the obtained image data based on the conversion characteristic information.

11. The reception device according to claim 10, wherein:
the first video stream further includes maximum luminance information indicating a maximum luminance level, and
the processing circuitry is configured to display the obtained image data based on the maximum luminance information.

12. The reception device according to claim 7, wherein:
the description includes conversion characteristic information indicating a characteristic of a high-dynamic-range conversion, and
the processing circuitry is configured to perform electro-optical conversion on the obtained image data based on the conversion characteristic information.

13. A reception device comprising:
reception circuitry configured to receive a broadcast signal including a description and first and second video streams, the first video stream including encoded image data of first image data and encoded image data of second image data, and the second video stream including encoded image data of third image data and encoded image data of fourth image data, wherein:
the first image data is for acquisition of image data of a first frame rate and a first resolution, the second image data is for acquisition of image data of a second frame rate and the first resolution based on the first image data, the third image data is for acquisition of image data of the first frame rate and a second resolution based on the first image data, and the fourth image data is for acquisition of image data of the second frame rate and the second resolution based on the first, second, and third image data,
the description indicates a first representation corresponding to the first video stream and a second representation corresponding to the second video stream; and processing circuitry configured to obtain image data for display by decoding encoded image data included in the first and second video streams based on the description.

14. The reception device according to claim 13, wherein:
a picture of the first image data and a picture of the second image data are encoded alternately in the first video stream, and
a picture of the third image data and a picture of the fourth image data are encoded alternately in the second video stream.

15. The reception device according to claim 13, wherein the description is a Media Presentation Description (MPD).

16. The reception device according to claim 13, wherein:
the first video stream includes conversion characteristic information indicating a characteristic of a high-dynamic-range conversion, and
the processing circuitry is configured to perform electro-optical conversion on the obtained image data based on the conversion characteristic information.

17. The reception device according to claim 16, wherein:
the first video stream further includes maximum luminance information indicating a maximum luminance level, and
the processing circuitry is configured to display the obtained image data based on the maximum luminance information.

18. The reception device according to claim 13, wherein:
the description includes conversion characteristic information indicating a characteristic of a high-dynamic-range conversion, and
the processing circuitry is configured to perform electro-optical conversion on the obtained image data based on the conversion characteristic information.

19. A reception method comprising:
receiving, by reception circuitry, a description and a first video stream including encoded image data of first image data and encoded image data of second image data, and a second video stream including encoded image data of third image data and encoded image data of fourth image data, wherein:
the first image data is for acquisition of image data of a first frame rate and a first resolution, the second image data is for acquisition of image data of a second frame rate and the first resolution based on the first image data, the third image data is for acquisition of image data of the first frame rate and a second resolution based on the first image data, and the fourth image data is for acquisition of image data of the second frame rate and the second resolution based on the first, second, and third image data,
the description indicates a first representation corresponding to the first video stream and a second representation corresponding to the second video stream,
the first video stream includes a first temporal layer for the encoded image data of the first image data and a second temporal layer for the encoded image data of the second image data,
the second video stream includes a third temporal layer for the encoded image data of the third image data and a fourth temporal layer for the encoded image data of the fourth image data, and
the first frame rate is lower than the second frame rate, and the first resolution is lower than the second resolution; and
obtaining, by processing circuitry, image data for display by decoding encoded image data included in the first and second video streams based on the description.

20. The reception method according to claim 19, wherein the description is a Media Presentation Description (MPD).

21. The reception method according to claim 19, wherein:
the first video stream includes conversion characteristic information indicating a characteristic of a high-dynamic-range conversion,
the reception method further comprises performing electro-optical conversion on the obtained image data based on the conversion characteristic information.

22. The reception method according to claim 21, wherein the first video stream further includes maximum luminance information indicating a maximum luminance level,
the reception method further comprises displaying the obtained image data based on the maximum luminance information.

23. The reception method according to claim 19, wherein:
the description includes conversion characteristic information indicating a characteristic of a high-dynamic-range conversion, and
the method comprises performing electro-optical conversion on the obtained image data based on the conversion characteristic information.

24. The reception method according to claim 19, wherein:
a picture of the first image data and a picture of the second image data are encoded alternately in the first video stream, and
a picture of the third image data and a picture of the fourth image data are encoded alternately in the second video stream.

25. A reception method comprising:
receiving, by reception circuitry, a description and a first video stream including encoded image data of first image data and encoded image data of second image data, and a second video stream including encoded image data of third image data and encoded image data of fourth image data, wherein:
the first image data is for acquisition of image data of a first frame rate and a first resolution, the second image data is for acquisition of image data of a second frame rate and the first resolution based on the first image data, the third image data is for acquisition of image data of the first frame rate and a second resolution based on the first image data, and the fourth image data is for acquisition of image data of the second frame rate and the second resolution based on the first, second, and third image data,
the description indicates a first representation corresponding to the first video stream and a second representation corresponding to the second video stream,
the first and second video streams are each managed with one track or two tracks; and
obtaining, by processing circuitry, image data for display by decoding encoded image data included in the first and second video streams based on the description.

26. The reception method according to claim 25, wherein:
a picture of the first image data and a picture of the second image data are encoded alternately in the first video stream, and
a picture of the third image data and a picture of the fourth image data are encoded alternately in the second video stream.

27. The reception method according to claim 25, wherein the description is a Media Presentation Description (MPD).

28. The reception method according to claim 25, wherein:
the first video stream includes conversion characteristic information indicating a characteristic of a high-dynamic-range conversion, and
the method comprises performing electro-optical conversion on the obtained image data based on the conversion characteristic information.

29. The reception method according to claim 28, wherein:
the first video stream further includes maximum luminance information indicating a maximum luminance level, and
the method comprises displaying the obtained image data based on the maximum luminance information.

30. The reception method according to claim 25, wherein:
the description includes conversion characteristic information indicating a characteristic of a high-dynamic-range conversion, and
the method comprises performing electro-optical conversion on the obtained image data based on the conversion characteristic information.

31. A reception method comprising:
receiving a broadcast signal including a description and first and second video streams, the first video stream including encoded image data of first image data and encoded image data of second image data, and the second video stream including encoded image data of third image data and encoded image data of fourth image data, wherein:
the first image data is for acquisition of image data of a first frame rate and a first resolution, the second image data is for acquisition of image data of a second frame rate and the first resolution based on the first image data, the third image data is for acquisition of image data of the first frame rate and a second resolution based on the first image data, and the fourth image data is for acquisition of image data of the second frame rate and the second resolution based on the first, second, and third image data,
the description indicates a first representation corresponding to the first video stream and a second representation corresponding to the second video stream; and
obtaining, by processing circuitry, image data for display by decoding encoded image data included in the first and second video streams based on the description.

32. The reception method according to claim 31, wherein:
a picture of the first image data and a picture of the second image data are encoded alternately in the first video stream, and
a picture of the third image data and a picture of the fourth image data are encoded alternately in the second video stream.

33. The reception method according to claim 31, wherein the description is a Media Presentation Description (MPD).

34. The reception method according to claim 31, wherein:
the first video stream includes conversion characteristic information indicating a characteristic of a high-dynamic-range conversion, and
the method comprises performing electro-optical conversion on the obtained image data based on the conversion characteristic information.

35. The reception method according to claim 34, wherein:
the first video stream further includes maximum luminance information indicating a maximum luminance level, and
the method comprises displaying the obtained image data based on the maximum luminance information.

36. The reception method according to claim 31, wherein:
the description includes conversion characteristic information indicating a characteristic of a high-dynamic-range conversion, and the method comprises performing electro-optical conversion on the obtained image data based on the conversion characteristic information.

* * * * *